(12) United States Patent
Sergeev et al.

(10) Patent No.: US 12,365,284 B2
(45) Date of Patent: Jul. 22, 2025

(54) HIGH INTENSITY ILLUMINATION SYSTEMS AND METHODS OF USE THEREOF

(71) Applicant: Carbon Autonomous Robotic Systems Inc., Seattle, WA (US)

(72) Inventors: Alexander Igorevich Sergeev, Newcastle, WA (US); Paul Anthony Mikesell, Bellevue, WA (US)

(73) Assignee: Carbon Autonomous Robotic Systems Inc., Seattle, WA (US)

( * ) Notice: Subject to any disclaimer, the term of this patent is extended or adjusted under 35 U.S.C. 154(b) by 0 days.

(21) Appl. No.: 19/043,183

(22) Filed: Jan. 31, 2025

(65) Prior Publication Data

US 2025/0178522 A1   Jun. 5, 2025

Related U.S. Application Data

(63) Continuation of application No. 19/033,411, filed on Jan. 21, 2025, which is a continuation of application
(Continued)

(51) Int. Cl.
*B60Q 1/24* (2006.01)
*B60Q 1/00* (2006.01)
(Continued)

(52) U.S. Cl.
CPC ........... *B60Q 1/249* (2022.05); *B60Q 1/0023* (2013.01); *G01C 11/02* (2013.01);
(Continued)

(58) Field of Classification Search
CPC ...... B60Q 1/249; B60Q 1/0023; G01C 11/02; G01N 21/8806; G01N 2021/8816;
(Continued)

(56) References Cited

U.S. PATENT DOCUMENTS

| 2,848,119 A | 8/1958 | Fitser |
| 3,302,052 A | 1/1967 | Schwab |

(Continued)

FOREIGN PATENT DOCUMENTS

| CA | 2705830 A1 | 5/2009 |
| CN | 105045950 A | 11/2015 |

(Continued)

OTHER PUBLICATIONS

Naio Technologies.: OZ Brochure. 8 pages (accessed on Jul. 30, 2019).
(Continued)

*Primary Examiner* — Jonathan M Hansen
(74) *Attorney, Agent, or Firm* — Fortem IP LLP

(57) ABSTRACT

Described herein are high intensity illumination systems including lighting arrays of lights, such as light emitting diodes, configured to illuminate a surface. The lighting arrays are configured to illuminate the surface with illumination comparable to or multiple times brighter than the ambient illumination, such as sunlight. Also described herein are methods of using a high intensity illumination system to illuminate a surface for applications including imaging, object detection, and object localization. The systems and methods described herein may be applied to a range of industries including farming, agriculture, construction, and autonomous vehicles.

30 Claims, 18 Drawing Sheets

Related U.S. Application Data

No. 17/978,494, filed on Nov. 1, 2022, now Pat. No. 12,240,372.

(60) Provisional application No. 63/274,686, filed on Nov. 2, 2021.

(51) Int. Cl.
  *G01C 11/02* (2006.01)
  *G01N 21/88* (2006.01)
  *H04N 23/56* (2023.01)

(52) U.S. Cl.
  CPC ......... *G01N 21/8806* (2013.01); *H04N 23/56* (2023.01); *G01N 2021/8816* (2013.01)

(58) Field of Classification Search
  CPC ............ H04N 23/56; G03B 2215/0557; G03B 2215/0567; G03B 15/05; G03B 15/06; A01M 21/00; A01M 21/02; A01M 21/043; A01M 21/046; A01M 7/0089
  See application file for complete search history.

(56) References Cited

U.S. PATENT DOCUMENTS

| | | | |
|---|---|---|---|
| 3,675,621 A | 7/1972 | Griffin et al. | |
| 3,741,214 A | 6/1973 | Tillander | |
| 3,778,155 A | 12/1973 | Leavitt | |
| 6,199,000 B1 | 3/2001 | Keller et al. | |
| 6,207,946 B1 | 3/2001 | Jusoh et al. | |
| 6,477,403 B1 | 11/2002 | Eguchi et al. | |
| 6,553,299 B1 | 4/2003 | Keller et al. | |
| 6,795,568 B1 | 9/2004 | Christensen et al. | |
| 7,526,100 B1 | 4/2009 | Hartman et al. | |
| 7,859,519 B2 | 12/2010 | Tulbert | |
| 7,919,723 B2 | 4/2011 | Ide et al. | |
| 7,993,585 B2 | 8/2011 | Black et al. | |
| 8,216,214 B2 | 7/2012 | Weir | |
| 8,665,436 B2 | 3/2014 | Pagnoux et al. | |
| 8,746,914 B2 | 6/2014 | Nelson et al. | |
| 9,000,340 B2 | 4/2015 | Dicander | |
| 9,207,309 B2 | 12/2015 | Bridges | |
| 9,289,122 B2 | 3/2016 | Chinnock et al. | |
| 9,456,067 B2 | 9/2016 | Rudow et al. | |
| 9,462,446 B2 | 10/2016 | Rudow et al. | |
| 9,467,814 B2 | 10/2016 | Rudow et al. | |
| 9,476,695 B2 | 10/2016 | Becker et al. | |
| 9,565,848 B2 | 2/2017 | Stowe et al. | |
| 9,609,859 B2 | 4/2017 | Stowe et al. | |
| 9,639,941 B2 | 5/2017 | Rudow et al. | |
| 9,654,222 B1 | 5/2017 | Shatz et al. | |
| 9,709,987 B2 | 7/2017 | Hyde et al. | |
| 9,955,551 B2 | 4/2018 | Spero | |
| 9,992,396 B1 | 6/2018 | Scepanovic et al. | |
| 10,006,872 B2 | 6/2018 | Seo et al. | |
| 10,010,067 B2 | 7/2018 | Kent et al. | |
| 10,051,854 B2 | 8/2018 | Stowe et al. | |
| 10,126,415 B2 | 11/2018 | Becker et al. | |
| 10,241,207 B2 | 3/2019 | Rosenzweig et al. | |
| 10,371,935 B1 | 8/2019 | Patel | |
| 10,489,621 B2 | 11/2019 | Moriyama | |
| 10,502,555 B2 | 12/2019 | Nakamura et al. | |
| 10,684,370 B2 | 6/2020 | Demersseman et al. | |
| 10,750,736 B2 | 8/2020 | Kent et al. | |
| 10,776,639 B2 | 9/2020 | Steinberg et al. | |
| 10,905,397 B2 | 2/2021 | Yang et al. | |
| 11,048,940 B2 | 6/2021 | Kiepe et al. | |
| 11,076,589 B1 | 8/2021 | Sibley et al. | |
| 11,093,745 B2 | 8/2021 | Redden et al. | |
| 11,129,343 B2 | 9/2021 | Redden et al. | |
| 11,153,499 B2 | 10/2021 | Behrooz et al. | |
| 11,255,663 B2 | 2/2022 | Binder | |
| 11,344,022 B2 | 5/2022 | Jackson et al. | |
| 11,373,288 B2 | 6/2022 | Peters | |
| 11,375,707 B1 | 7/2022 | Guice et al. | |
| 11,399,531 B1 | 8/2022 | Sibley et al. | |
| 11,425,852 B2 | 8/2022 | Sibley et al. | |
| 11,432,470 B2 | 9/2022 | Kurihara et al. | |
| 11,517,008 B1 | 12/2022 | Sibley et al. | |
| 11,526,997 B2 | 12/2022 | Sibley et al. | |
| 11,553,634 B2 | 1/2023 | Grant et al. | |
| 11,553,636 B1 | 1/2023 | Palomares et al. | |
| 11,589,570 B2 | 2/2023 | Schlemmer | |
| 11,602,143 B2 | 3/2023 | Mikesell et al. | |
| 11,694,434 B2 | 7/2023 | Sibley et al. | |
| 11,748,976 B2 | 9/2023 | Redden et al. | |
| 11,751,559 B2 | 9/2023 | Sibley et al. | |
| 11,785,873 B2 | 10/2023 | Sibley et al. | |
| 11,937,524 B2 | 3/2024 | Sibley et al. | |
| 12,056,845 B2 | 8/2024 | Peake et al. | |
| 12,108,752 B2 | 10/2024 | Mikesell et al. | |
| 12,240,372 B2 * | 3/2025 | Sergeev | H04N 23/56 |
| 2011/0211733 A1 | 9/2011 | Schwarz | |
| 2013/0194548 A1 | 8/2013 | Francis et al. | |
| 2013/0235183 A1 | 9/2013 | Redden | |
| 2014/0028861 A1 | 1/2014 | Holz | |
| 2014/0180549 A1 | 6/2014 | Siemens et al. | |
| 2014/0311014 A1 | 10/2014 | Feugier | |
| 2015/0070712 A1 | 3/2015 | Cramer et al. | |
| 2015/0071490 A1 | 3/2015 | Fukata et al. | |
| 2015/0075067 A1 | 3/2015 | Stowe et al. | |
| 2015/0075068 A1 | 3/2015 | Stowe et al. | |
| 2015/0245554 A1 | 9/2015 | Redden | |
| 2016/0117560 A1 | 4/2016 | Levi et al. | |
| 2016/0181764 A1 | 6/2016 | Kanskar et al. | |
| 2016/0205918 A1 | 7/2016 | Chan et al. | |
| 2016/0286779 A1 | 10/2016 | Guice | |
| 2017/0146654 A1 | 5/2017 | Halloran et al. | |
| 2017/0188564 A1 | 7/2017 | Stowe et al. | |
| 2018/0136319 A1 | 5/2018 | Send et al. | |
| 2018/0285482 A1 | 10/2018 | Santos et al. | |
| 2019/0097722 A1 | 3/2019 | Mclaurin et al. | |
| 2019/0159442 A1 | 5/2019 | Benjegerdes | |
| 2019/0200519 A1 | 7/2019 | Chrysanthakopoulos et al. | |
| 2019/0274296 A1 | 9/2019 | Schmidt | |
| 2019/0285893 A1 | 9/2019 | Wang et al. | |
| 2019/0353784 A1 | 11/2019 | Toledano et al. | |
| 2020/0116643 A1 | 4/2020 | Kun et al. | |
| 2020/0120886 A1 | 4/2020 | Geltner | |
| 2020/0150446 A1 | 5/2020 | Thibon et al. | |
| 2020/0205394 A1 | 7/2020 | Day et al. | |
| 2021/0056721 A1 * | 2/2021 | Barrick | A01B 69/001 |
| 2021/0076662 A1 | 3/2021 | Mikesell et al. | |
| 2021/0230904 A1 | 7/2021 | Pizzato et al. | |
| 2022/0254155 A1 | 8/2022 | Janssen et al. | |
| 2022/0299635 A1 | 9/2022 | Sergeev | |
| 2022/0361475 A1 | 11/2022 | Bachman et al. | |
| 2023/0044040 A1 | 2/2023 | Xu et al. | |
| 2023/0121291 A1 | 4/2023 | Sibley et al. | |
| 2023/0122084 A1 | 4/2023 | Sibley et al. | |
| 2023/0137419 A1 | 5/2023 | Sergeev et al. | |
| 2023/0232811 A1 | 7/2023 | Einat | |
| 2023/0237697 A1 | 7/2023 | Pillmann et al. | |
| 2023/0247928 A1 | 8/2023 | Sibley et al. | |
| 2023/0252624 A1 | 8/2023 | Sergeev et al. | |
| 2023/0252789 A1 | 8/2023 | Sibley et al. | |
| 2023/0252791 A1 | 8/2023 | Webb et al. | |
| 2023/0270036 A1 | 8/2023 | Groffils et al. | |
| 2023/0292736 A1 | 9/2023 | Mikesell et al. | |
| 2023/0292737 A1 | 9/2023 | Thompson et al. | |
| 2023/0309444 A1 | 10/2023 | Cordeiro et al. | |
| 2023/0333011 A1 | 10/2023 | Dev et al. | |
| 2023/0343090 A1 | 10/2023 | Khait et al. | |
| 2023/0360392 A1 | 11/2023 | Sibley et al. | |
| 2023/0363370 A1 | 11/2023 | Delatree et al. | |
| 2023/0371493 A1 | 11/2023 | Werner et al. | |
| 2023/0384794 A1 | 11/2023 | Brossard et al. | |
| 2023/0397597 A1 | 12/2023 | Charipar et al. | |
| 2023/0404056 A1 | 12/2023 | Sibley et al. | |
| 2023/0413800 A1 | 12/2023 | Jasko et al. | |
| 2024/0020951 A1 | 1/2024 | Redden et al. | |
| 2024/0041018 A1 | 2/2024 | Mikesell et al. | |
| 2024/0049697 A1 | 2/2024 | Schmeer et al. | |

(56) References Cited

U.S. PATENT DOCUMENTS

| | | |
|---|---|---|
| 2024/0057502 A1 | 2/2024 | Sibley et al. |
| 2024/0074427 A1 | 3/2024 | Tanner |
| 2024/0155221 A1 | 5/2024 | Watanabe |
| 2024/0206451 A1 | 6/2024 | Anderson |
| 2024/0224977 A9 | 7/2024 | Leger et al. |
| 2024/0251694 A1 | 8/2024 | Sibley et al. |
| 2024/0268246 A1 | 8/2024 | Stark et al. |
| 2024/0268277 A1 | 8/2024 | Cochrane et al. |

FOREIGN PATENT DOCUMENTS

| | | |
|---|---|---|
| CN | 114641666 A | 6/2022 |
| EP | 2848119 B1 | 12/2016 |
| EP | 3302052 B1 | 10/2019 |
| EP | 3700337 A1 | 9/2020 |
| EP | 3700338 A1 | 9/2020 |
| EP | 3937628 A1 | 1/2022 |
| EP | 4031832 A1 | 7/2022 |
| EP | 4147942 A1 | 3/2023 |
| EP | 4175470 A2 | 5/2023 |
| EP | 3618609 B1 | 8/2023 |
| EP | 4228403 A1 | 8/2023 |
| EP | 4228404 A1 | 8/2023 |
| EP | 4243592 A1 | 9/2023 |
| EP | 4243613 A1 | 9/2023 |
| EP | 4031832 A4 | 10/2023 |
| EP | 4301135 A1 | 1/2024 |
| EP | 4309129 A1 | 1/2024 |
| EP | 4185106 B1 | 5/2024 |
| EP | 4358712 A1 | 5/2024 |
| EP | 4358713 A1 | 5/2024 |
| EP | 4358714 A1 | 5/2024 |
| EP | 3675621 B1 | 8/2024 |
| EP | 3741214 B1 | 8/2024 |
| EP | 4418845 A1 | 8/2024 |
| JP | 2015062412 A | 4/2015 |
| JP | 2022548645 A | 11/2022 |
| KR | 1020150124305 A | 11/2015 |
| WO | 2002017705 A1 | 7/2004 |
| WO | 2009126264 A2 | 10/2009 |
| WO | 2013111134 A1 | 8/2013 |
| WO | 2019064062 A1 | 4/2019 |
| WO | 2019079556 A1 | 4/2019 |
| WO | 2019144231 A1 | 8/2019 |
| WO | 2019222109 A1 | 11/2019 |
| WO | 2021055485 A1 | 3/2021 |
| WO | 2022006643 A1 | 1/2022 |
| WO | 2022043568 A2 | 3/2022 |
| WO | 2022197831 A1 | 9/2022 |
| WO | 2023021769 A1 | 2/2023 |
| WO | 2023058333 A1 | 4/2023 |
| WO | 2023081135 A1 | 5/2023 |
| WO | 2023150023 A1 | 8/2023 |
| WO | 2023180566 A1 | 9/2023 |
| WO | 2024165111 A1 | 8/2024 |
| WO | 2024168302 A1 | 8/2024 |

OTHER PUBLICATIONS

Amjoud, et al., "Convolutional Neural Networks Backbones for Object Detection", Springer, ICISP 2020, LNCS 12119, 2020, pp. 282-289.

Farmwise-Flyer, "Vulcan", World Ag Expo, Feb. 14, 2023, Retrieved from the internet URL: https://farmwise.io/assets/downloads/Farmwise-Flyer-2023.pdf, 2 pages.

Gosselink, et al., "Lignin as a Renewable Aromatic Resource for the Chemical Industry", PhD Thesis, Wageningen University, Wageningen, NL, 2011, 198 pages.

Wu, et al., "Design and Implementation of Computer Vision based In-Row Weeding System", HAL Open Science. hal-01876696, 2018, 8 pages.

Nadimi, et al., "Designing, modeling and controlling a novel autonomous laser weeding system", ASABE Technical Library—Jan. 2009; pp. 8.

\* cited by examiner

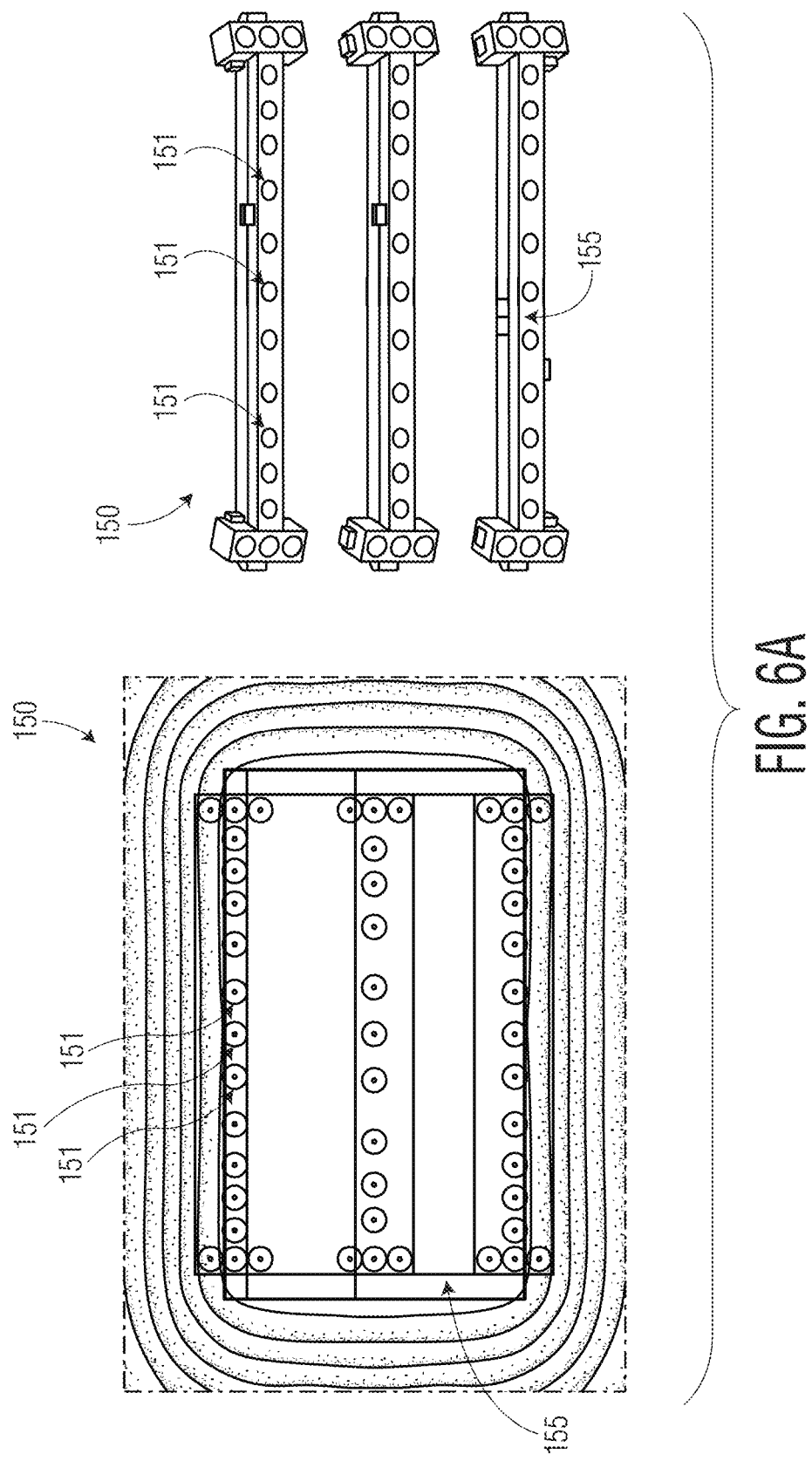

HIGH INTENSITY ILLUMINATION SYSTEMS AND METHODS OF USE THEREOF

CROSS-REFERENCE

This application is a continuation of U.S. application Ser. No. 19/033,411, filed Jan. 21, 2025, which is a continuation of U.S. application Ser. No. 17/978,494, filed Nov. 1, 2022, which claims the benefit of U.S. Provisional Application No. 63/274,686, entitled "HIGH INTENSITY ILLUMINATION SYSTEMS AND METHODS OF USE THEREOF," filed on Nov. 2, 2021, each of which is incorporated herein by reference in its entirety.

BACKGROUND

Accuracy of automated object detection in an image is highly dependent on the quality of the image. Furthermore, training systems for automated object detection in images collected under inconsistent imaging conditions require large amounts of training data to account for variations in imaging conditions. There is a need for systems to generate consistent imaging conditions for automated object detection in a variety of irregular environments.

SUMMARY

In various aspects, the present disclosure provides an object targeting system comprising: a lighting array comprising a plurality of light emitters configured to emit light and illuminate a region of interest with an illuminance that is brighter than ambient illumination, wherein the region of interest defines an area on a surface; and a detection system comprising: a camera configured to image the region of interest, wherein the region of interest contains an object to be targeted, an object location module configured to determine an object location based on an image of the object collected by the camera, and an implement configured to target the object at the object location.

In some aspects, the illuminance within the region of interest is consistent over a depth of field range of not less than 8 cm when the lighting array is activated. In some aspects, the illuminance within the region of interest is consistent over the region of interest when the lighting array is activated. In some aspects, the illuminance within the region of interest is consistent over an area of at least 0.1 m$^2$ when the lighting array is activated. In some aspects, the ambient illumination comprises sunlight. In some aspects, the lighting array is configured to produce an illuminance of not less than 120,000, not less than 240,000, or not less than 360,000 lumens per m$^2$ (lux). In some aspects, the lighting array is configured to produce an illuminance of not less than 200,000 lux and not more than 700,000 lux.

In some aspects, the illuminance within the region of interest varies by no more than 50% from day to night when the lighting array is activated. In some aspects, the illuminance within the region of interest varies by no more than 20% from day to night when the lighting array is activated. In some aspects, the illuminance within the region of interest varies by no more than 50% across the region of interest when the lighting array is activated. In some aspects, the illuminance within the region of interest varies by no more than 20% across the region of interest when the lighting array is activated.

In some aspects, the plurality of light emitters is arranged in a line, a circle, an oval, an irregular pattern, or a combination thereof. In some aspects, the camera has an exposure time of not more than 1.5 ms. In some aspects, the camera has a resolution of not less than 100 pixels per inch.

In some aspects, the object targeting system is coupled to a vehicle, wherein the vehicle is configured to move relative to the surface. In some aspects, the detection system is coupled to the vehicle such that the region of interest imaged by the detection system is underneath the vehicle. In some aspects, the lighting array is coupled to the vehicle such that the region of interest illuminated by the lighting array is underneath the vehicle. In some aspects, the vehicle is capable of moving at a speed of not less than 2 km/hr or not less than 1.2 miles/hr relative to the surface. In some aspects, the vehicle is capable of moving at a speed of not less than 2 km/hr and not more than 8 km/hr or not less than 1.2 miles/hr and not more than 5.0 miles/hr relative to the surface.

In some aspects, the object targeting system further comprises a computer and a strobe circuit module, wherein the computer is configured to control the strobe circuit module, and wherein the strobe circuit module is configured to activate and deactivate the lighting array and to synchronize an exposure time of the camera to an activation state of the lighting array. In some aspects, the strobe circuit module is configured to activate the lighting array when the exposure time of the camera begins and to deactivate the lighting array when the exposure time of the camera ends.

In some aspects, the surface is a ground surface. In some aspects, the surface is an agricultural surface. In some aspects, the object is a plant. In some aspects, the object is a weed. In some aspects, the surface is a construction surface. In some aspects, the implement is a laser. In some aspects, the laser is configured to burn the object. In some aspects, the implement is a sprayer. In some aspects, the sprayer is configured to spray the object. In some aspects, the implement is a grabber. In some aspects, the grabber is configured to move the object. In some aspects, the light emitters are light emitting diodes (LEDs).

In various aspects, the present disclosure provides a method of targeting an object, the method comprising: (a) activating a lighting array comprising a plurality of light emitters to emit light and illuminate a region of interest defining an area on a surface with an illuminance that is brighter than ambient illumination; (b) collecting, via a camera, an image of the region of interest over an exposure time corresponding to a time between initiating collection of the image and terminating collection of the image; (c) terminating collection of the image; (d) deactivating the lighting array; (e) determining a location of the object based on the image; and (f) targeting the object with an implement at the location.

In some aspects, the method comprises illuminating the region of interest with an illuminance of not less than 120,000, not less than 240,000, or not less than 360,000 lumens per m$^2$ (lux). In some aspects, the method comprises illuminating the region of interest with an illuminance of not less than 200,000 lux and not more than 700,000 lux. In some aspects, the method comprises illuminating the region of interest with an illuminance that varies by no more than 50% or no more than 20% from day to night. In some aspects, the method comprises illuminating the region of interest with an illuminance that varies by no more than 50% or no more than 20% across the region of interest. In some aspects, the method comprises the ambient illumination comprises sunlight.

In some aspects, the method further comprises repeating steps (a)-(c) with a period corresponding to a camera frame rate. In some aspects, the exposure time is not more than 7% or not more than 15% of the camera frame rate. In some aspects, the exposure time is not less than 2% and not more than 15% of the camera frame rate. In some aspects, the lighting array and the camera are coupled to a vehicle such that the region of interest illuminated by the lighting array is located underneath the vehicle.

In some aspects, the implement is coupled to the vehicle. In some aspects, the vehicle is moving relative to the surface. In some aspects, the vehicle is moving relative to the surface at a speed of not less than 2 km/hr and not more than 8 km/hr or not less than 1.2 miles/hr and not more than 5.0 miles/hr.

In some aspects, the exposure time is not more than 1.5 ms. In some aspects, the exposure time is not more than 500 µs. In some aspects, a resolution of the image is not less than 100 pixels per inch.

In some aspects, the method comprises performing step (a) and initiating step (b) within 0.1 ms or within 10 µs of each other, wherein step (a) is performed before step (b) is initiated, or wherein step (b) is initiated before step (a) is performed. In some aspects, the method comprises activating the light array within 0.1 ms or within 10 µs of initiating collection of the image. In some aspects, the method comprises activating the light array before initiating collection of the image. In some aspects, the method comprises activating the light array after initiating collection of the image. In some aspects, the method comprises performing step (a) simultaneously with initiating step (b). In some aspects, the method comprises activating the lighting array and initiating collection of the image simultaneously.

In some aspects, the method comprises performing steps (c) and (d) within 0.1 ms or within 10 µs of each other, wherein step (c) is performed before step (d) or step (d) is performed before step (c). In some aspects, the method comprises deactivating the light array within 0.1 ms or within 10 µs of terminating collection of the image. In some aspects, the method comprises deactivating the light array before terminating collection of the image. In some aspects, the method comprises deactivating the light array after terminating collection of the image. In some aspects, the method comprises performing steps (c) and (d) simultaneously. In some aspects, the method comprises deactivating the lighting array and terminating collection of the image simultaneously.

In some aspects, targeting the object with the implement comprises burning the object with a laser. In some aspects, targeting the object with the implement comprises spraying the object with a sprayer. In some aspects, targeting the object with the implement comprises moving the object with a grabber. In some aspects, the object is a weed.

In various aspects, the present disclosure provides a system for illuminating a region of interest on a surface, the system comprising a lighting array comprising a plurality of light emitters configured to emit light toward the region of interest, the light array configured to illuminate the region of interest with an illuminance that is brighter than ambient illumination, wherein the region of interest defines an area on the surface, and wherein the high intensity illumination system provides consistent illumination within a depth of field range of at least 8 cm.

In some aspects, the plurality of light emitters produces an illuminance of not less than 120,000 lumens per m$^2$ (lux). In some aspects, the plurality of light emitters produces an illuminance of not less than 240,000 lux. In some aspects, the plurality of light emitters produces of not less than 360,000 lux. In some aspects, the plurality of light emitters produces an illuminance of not less than 200,000 lux and not more than 700,000 lux. In some aspects, the ambient illumination comprises sunlight.

In some aspects, the surface is a ground surface. In some aspects, the surface is an agricultural surface. In some aspects, the surface is a construction surface.

In some aspects, the illumination is consistent over an area of at least 0.1 m$^2$. In some aspects, the plurality of light emitters is arranged in a line, a circle, an oval, an irregular pattern, or a combination thereof. In some aspects, an arrangement of the plurality of light emitters produces even illumination of the surface. In some aspects, one or more light emitters of the plurality of light emitters are angled relative to other light emitters of the plurality of light emitters. In some aspects, the plurality of light emitters comprises light emitting diodes (LEDs).

In some aspects, the illuminance at the surface varies by no more than 50% from day to night. In some aspects, the illuminance at the surface varies by no more than 20% from day to night. In some aspects, the illuminance at the surface varies by no more than 50% across the region of interest. In some aspects, the illuminance at the surface varies by no more than 20% across the region of interest.

In some aspects, the system further comprises a camera configured to image the region of interest. In some aspects, the camera images the region of interest with an exposure time of no more than 1.5 ms. In some aspects, the camera images the region of interest with a resolution of not less than 100 pixels per inch.

In various aspects, the present disclosure provides a system for controlling a lighting array, the system comprising a computer, a strobe circuit module, a lighting array having a plurality of light emitters, and a camera; wherein the computer is configured to control the strobe circuit module, and wherein the strobe circuit module is configured to turn the light emitters on and off and to synchronize an exposure time of the camera to an on/off state of the plurality of light emitters.

In some aspects, the system further comprises a capacitor, wherein the capacitor is configured to charge while the plurality of light emitters is in an off state. In some aspects, discharging the capacitor is configured to turn on the plurality of light emitters. In some aspects, the system further comprises a heat sink configured to dissipate heat from the plurality of light emitters. In some aspects, the strobe circuit module is configured to operate the plurality of light emitters with a duty ratio of no more than 15%. In some aspects, the strobe circuit module is configured to operate the plurality of light emitters with a duty ratio of no more than 7%. In some aspects, the strobe circuit module is configured to operate the plurality of light emitters with a duty ratio of not less than 2% and not more than 15%. In some aspects, the strobe circuit module is configured to expose the camera while the plurality of light emitters are on. In some aspects, the strobe circuit module is configured to provide a voltage of at least double a recommended voltage at which the plurality of light emitters were designed to operate.

In some aspects, the lighting array is configured to produce an illuminance of least 120,000 lumens per m$^2$ (lux). In some aspects, the lighting array is configured to produce an illuminance of at least 240,000 lux. In some aspects, the lighting array is configured to produce an illuminance of at least 360,000 lux. In some aspects, the lighting array is configured to produce an illuminance of from 200,000 lux to 700,000 lux.

In some aspects, the camera is configured to operate with an exposure time of at most 1.5 ms. In some aspects, the camera is configured to operate with an exposure time of at most 500 µs.

In various aspects, the present disclosure provides a method of illuminating a region of interest on a surface, the method comprising: emitting light from a high intensity illumination system including a lighting array having a plurality of light emitters to emit the light; directing the light toward the region of interest defining an area on the surface; and illuminating the region of interest with an illuminance of at least 120,000 lumens per m² (lux) consistently across the region of interest within a depth of field range of at least 8 cm or at least 3.1 in.

In some aspects, the method comprises illuminating the region of interest consistently over an area of at least 0.1 m². In some aspects, the method comprises illuminating the region of interest with an illuminance that varies by no more than 50% from day to night. In some aspects, the method comprises illuminating the region of interest with an illuminance that varies by no more than 20% from day to night. In some aspects, the method comprises illuminating the region of interest with an illuminance that varies by no more than 50% across the region of interest. In some aspects, the method comprises illuminating the region of interest with an illuminance that varies by no more than 20% across the region of interest.

In some aspects, the method further comprises turning the plurality of light emitters on and off in an on/off cycle. In some aspects, the method comprises turning on the plurality of light emitters for not more than 15% of the on/off cycle. In some aspects, the method comprises turning on the plurality of light emitters for not more than 7% of the on/off cycle. In some aspects, the method comprises turning on the plurality of light emitters for not less than 2% and not more than 15% of the on/off cycle.

In some aspects, the method further comprises imaging the region of interest with a camera to collect an image. In some aspects, an exposure time of the camera is synchronized with an on state of the light emitters. In some aspects, the plurality of light emitters is on while the camera is exposing. In some aspects, the exposure time of the camera is not more than 1.5 ms. In some aspects, the exposure time of the camera is not more than 500 µs. In some aspects, the image collected by the camera comprises a resolution of at least 100 pixels per inch. In some aspects, the image has reduced motion blurring compared to an image without illuminating the region of interest with the lighting array.

In some aspects, the method further comprises identifying and/or locating an object in the image. In some aspects, the object is located on, above, or below the surface.

In some aspects, the high intensity illumination system is coupled to a vehicle. In some aspects, the method further comprises moving the vehicle relative to the surface. In some aspects, the vehicle is moving at a speed of not less than 2 km/hr and not more than 8 km/hr or not less than 1.2 miles/hr and not more than 5.0 miles/hr relative to the surface. In some aspects, the vehicle is moving at a speed of not less than 2 km/hr or not less than 1.2 miles/hr relative to the surface.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 6A schematically illustrates bottom views of a lighting array for a high intensity illumination system, in accordance with one or more embodiments herein;

DETAILED DESCRIPTION

Figure 1A:
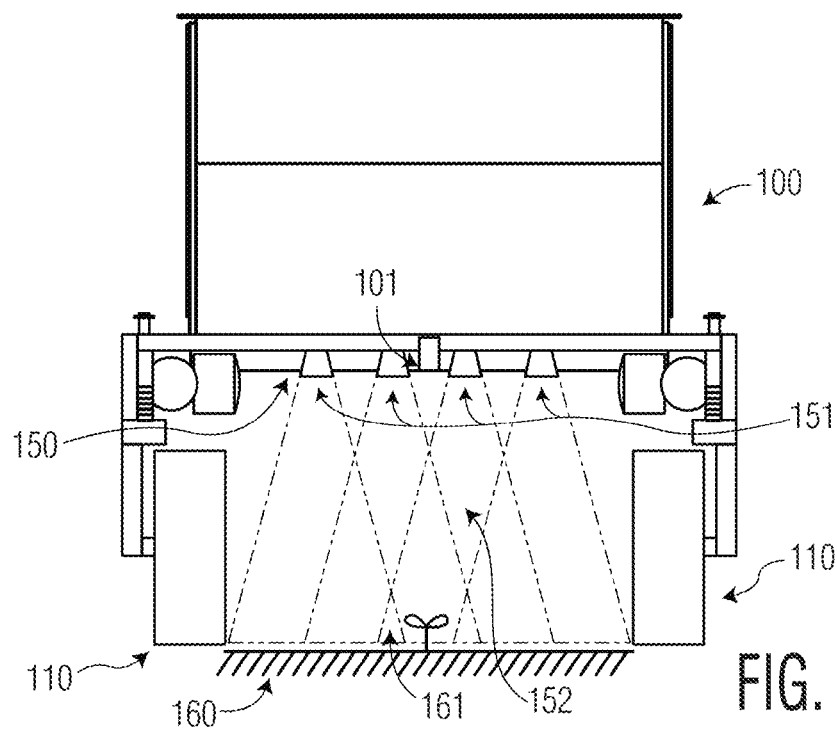
FIG. 1A illustrates a front view of an autonomous weed eradication vehicle, a detection system, and lighting array, in accordance with one or more embodiments herein.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods, and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

High Intensity Illumination Systems and Methods

The present disclosure provides systems and methods to produce consistent, high-intensity illumination over a region of interest on a surface. Such systems and methods may enable collection of high quality, high resolution, and/or short exposure images of the region of interest, independent of ambient light (e.g., solar illumination in an outdoor environment). Collection of consistent high quality, high resolution, and/or short exposure images may be beneficial for a number of applications, including automated object detection, which depends on quality and consistency of images to recognize objects within the image. Automated object detection often uses machine learning software trained with training image sets containing known objects. In these cases, accuracy of object detection in an image depends on consistency between the training data and the image, as well as a high level of image clarity and definition. For images collected under highly variable conditions, large amounts of training data may be needed to account for these variable conditions. For blurred or low-quality images (e.g., low resolution, overexposed, or underexposed) even large amounts of training may be unable to account for image variations because the object features may not be discernable. Collecting images under consistent, high intensity illumination, such as with the systems and methods described herein, substantially reduces the amount of training data needed to train object recognition software. In some embodiments, an automated object detection system trained using training images collected under illumination of a high intensity illumination system may require 10-fold to 100-fold fewer images to train the system than an automated object detection system trained using training images collected without high intensity illumination. For examples, an automated object detection system trained using training images collected under illumination of a high intensity illumination system may require about 25 to 250, about 50 to 500, or about 75 to 750 training images, and an automated object detection system trained using training images collected without high intensity illumination may require about 250 to 2500, about 500 to 5000, or about 750 to 7500 training images. Additionally, imaging a region of interest illuminated with high intensity illumination may be performed at higher resolution and/or shorter exposure time than imaging performed under ambient or lower intensity lighting conditions since increasing the resolution and shortening the exposure time both reduce the amount of light received per pixel.

Figure 2:
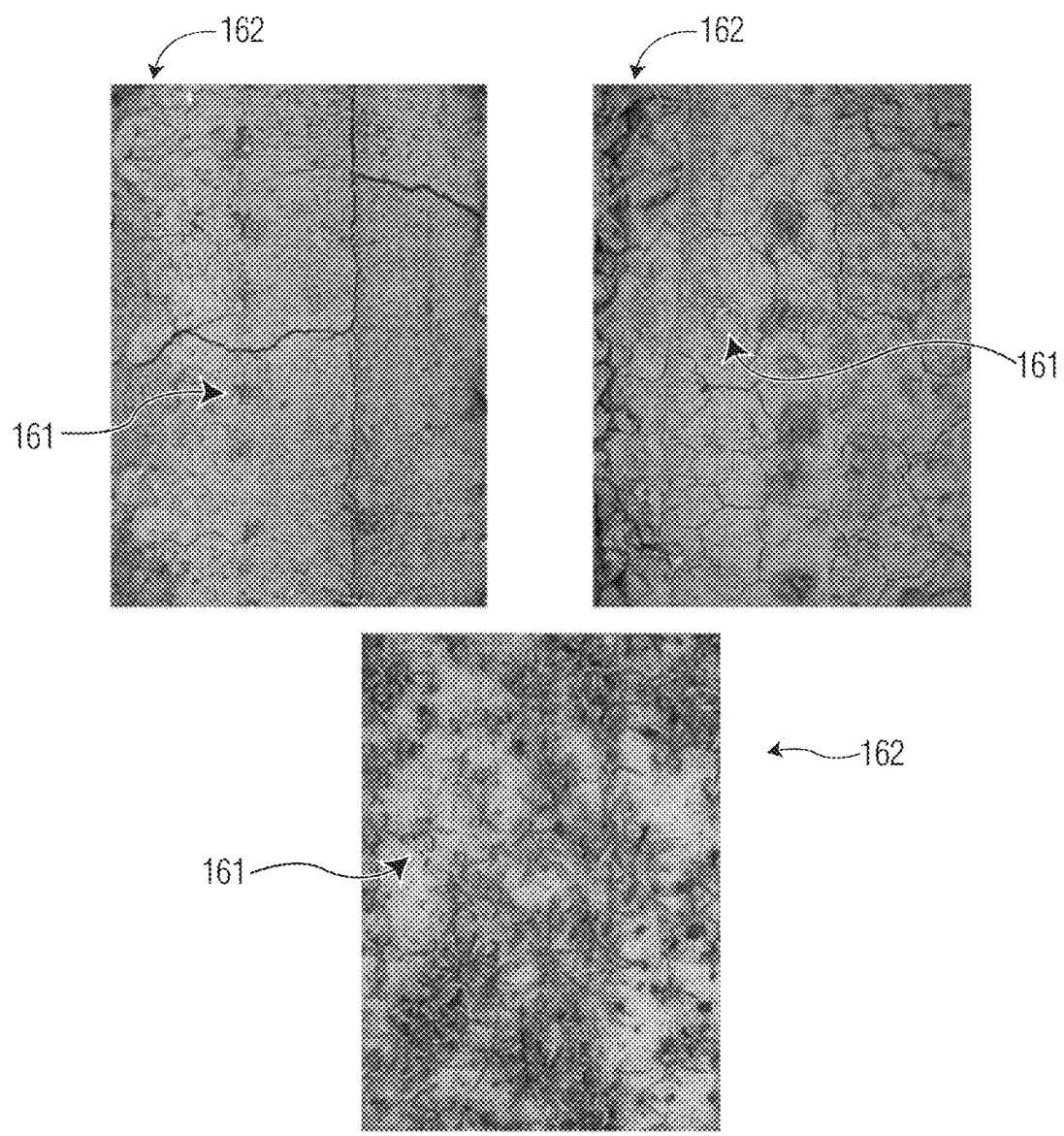
FIG. 2 shows example images of regions of interest illuminated using a high intensity illumination system, in accordance with one or more embodiments herein.
Figure 3:
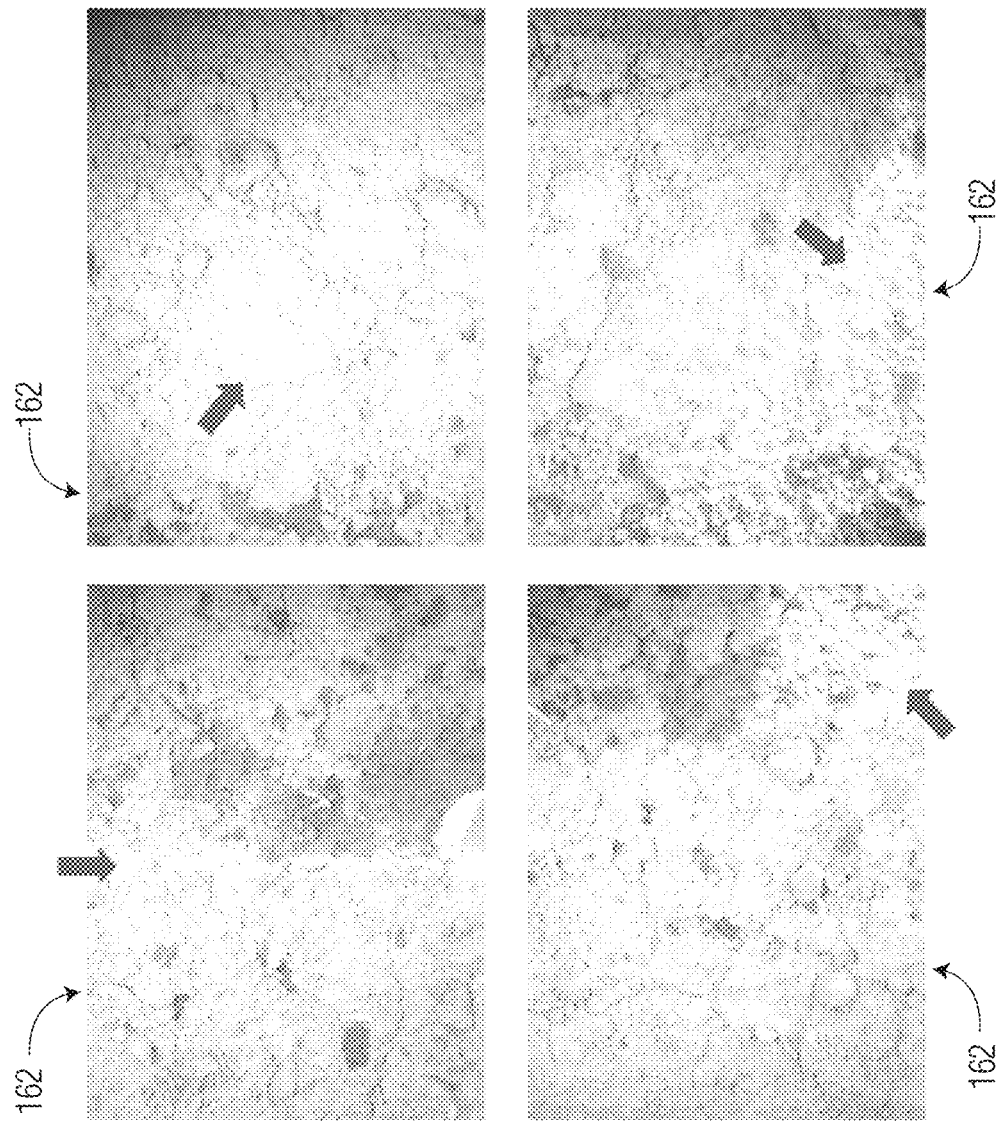
FIG. 3 shows images of a region of interest collected without high intensity illumination.

Described herein are high intensity illumination systems for illuminating a region of interest on a surface. Such high intensity illumination may facilitate imaging the surface by providing bright, uniform illumination of the region of interest. A high intensity illumination system comprising a lighting array may be configured to illuminate a surface with even illumination across a region of interest such that images collected of the region of interest are not overexposed or underexposed in parts of the image due to shadows or irregular lighting. The surface may be a rugged surface, such as a dirt surface. Examples of images with overexposed areas due to glare from the sun that were collected without use of a high intensity illumination system are shown in FIG. 3. The images provided in FIG. 3 contain clipped regions in which the light level in the region is either below a threshold of detection of the camera (underexposed) or saturating the camera (overexposed). Overexposed areas are denoted with shaded arrows. Example images of regions of interest 162 containing objects 161 illuminated with a high intensity illumination system as described herein are shown in FIG. 2.

A high intensity illumination system of the present disclosure may provide bright, even illumination of a region of interest (e.g., a region on a surface underneath a vehicle) despite changes in ambient lighting conditions. The high intensity illumination system may illuminate the region of interest with an intensity that is multiple times brighter than ambient illumination (e.g., sunlight), such that the ambient illumination does not cause uneven illumination across the region of interest. For example, the high intensity illumination system may evenly illuminate the region of interest over the course of a day as the angle and intensity of sunlight changes. The high intensity illumination system may provide even illumination across the region of interest without use of a light-blocking shroud or skirt to block ambient light from reaching the region of interest.

A high intensity illumination system may evenly illuminate a region of interest (e.g., a region on a surface underneath a vehicle) such that an image collected of the region of interest (e.g., an image collected by a camera) is not over- or under-exposed, also referred to as "clipped." In some embodiments, a light level across the region of interest may be within a dynamic range of a camera used to collect an image of the region of interest. In contrast, an image collected of a region that is not illuminated with a high intensity illumination system may contain regions that are over-exposed (e.g., saturating the camera used to collect the image), under-exposed (e.g., below a detection threshold of the camera used to collect the image), or both. For example, an image collected of a region that is not illuminated with a high intensity illumination system may be clipped such that A high intensity illumination system may facilitate collection of color images of a region illuminated by the high intensity illumination system. A color image may be collected using two or more color channels, such as an RGB image collected using red, blue, and green color channels. A region of interest illuminated by a high intensity illumination system may be illuminated such that intensities collected in each color channel (e.g., each of a red channel, a green channel, and a blue channel) are within a dynamic range of the image sensor, such that none of the channels are clipped (e.g., overexposed or underexposed). In some embodiments, the intensities collected in each color channel (e.g., each of a red channel, a green channel, and a blue channel) may be within a standard deviation of each other. For example, the mean intensity of the red channel may be within a standard deviation of the mean intensities of each of the green channel and the blue channel, the mean intensity of the blue channel may be within a standard deviation of the mean intensities of each of the green channel and the red channel, the mean intensity of the green channel may be within a standard deviation of the mean intensities of each of the red channel and the blue channel, or a combination thereof.

Also described herein are methods of illuminating a surface using a high intensity illumination system and imaging the illuminated surface with high resolution (e.g., at least 100 pixels per inch or at least 200 pixels per inch) and/or short exposure time (e.g., no more than 1.5 ms or no more than 300 µs). These methods may be used to illuminate and image a surface (e.g., a dirt surface) and to identify and/or locate objects (e.g., plants or weeds) in the images. In some embodiments, the high intensity illumination systems may be incorporated into a vehicle (e.g., an autonomous vehicle) to illuminate an area under, in front of, behind, or around the vehicle. In some embodiments, the high intensity illumination methods described herein may be used to facilitate object identification and/or location in a farming, agricultural, or construction environment.

A high intensity illumination system of the present disclosure may comprise a plurality of light emitters, such as emitting diodes (LEDs), arranged in a lighting array. The light emitters may be configured to emit light toward a surface and illuminate a region of the surface (e.g., a region of interest of the surface). The light emitters may provide even illumination across the region and over a depth of field range of at least 5 cm, at least 8 cm, at least 12 cm, or at least 12.7 cm. The illumination may be substantially uniform across a region of the surface that is at least 0.1 $m^2$, least 0.15 $m^2$, least 0.2 $m^2$, or least 0.25 $m^2$. In some embodiments, the illumination brightness may vary by no more than 5%, no more than 10%, no more than 20%, no more than no more than 30%, no more than 40%, or no more than 50% across the region of the surface.

The high intensity illumination system may be configured to illuminate the surface with an illuminance that is comparable to or brighter than ambient lighting conditions (e.g., the sun, interior lighting, or exterior lighting). The illuminance may be twice, three times, four times, or five times as bright as ambient lighting conditions. For example, under daylight conditions where most ambient light is sunlight, the high intensity illumination may provide consistent illumination of a region of a surface (e.g., the ground) even as the sun changes positions relative to the surface throughout the day. In some embodiments, the high intensity illumination system may illuminate the region of the surface with illumination comparable to the illumination provided by the sun on a bright day. In some embodiments, the high intensity illumination system may illuminate the region of the surface with illumination that is twice, three times, four times, five times, six times, eight times, or ten times as bright as illumination provided by the sun on a bright day. In some embodiments, the high intensity illumination system may illuminate the region of the surface with an illuminance of at least 120,000 lumens per $m^2$ (lux), at least 240,000 lux, at least 360,000 lux, at least 600,000 lux, 800,000 lux, 1,000,000 lux, or 1,200,000 lux. In some embodiments, the high intensity illumination system may illuminate the region of the surface with an illuminance of from 200,000 lux to 700,000 lux, from 240,000 lux to 800,000 lux, from 300,000 lux to 1,000,000 lux, or from 400,000 lux to 1,200,000 lux.

High intensity illumination comparable to or brighter than ambient lighting conditions may enable imaging at all times of day or night without variations due to the presence, absence, or angle of the sun. For example, the high intensity illumination system may provide even illumination without glare or shadowing across the region of the surface even when the sun encounters the surface at a low angle. For example, illumination intensity may change by no more than 20%, no more than 30%, no more than 40%, or no more than 50% from day to night.

Figure 1B:
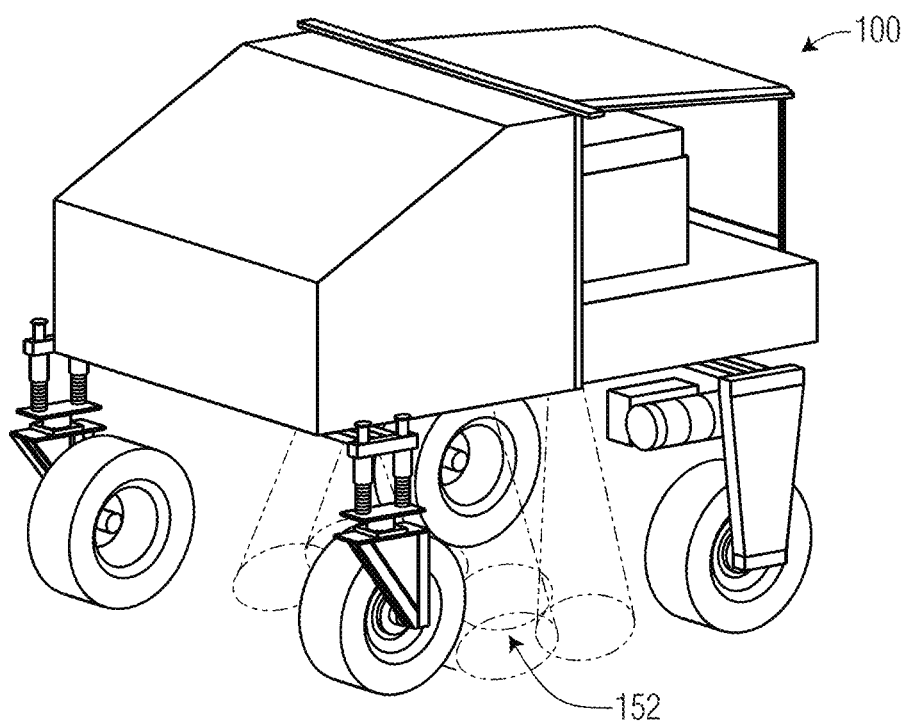
FIG. 1B illustrates an isometric view of an autonomous weed eradication vehicle, a detection system, and lighting array, in accordance with one or more embodiments herein.
Figure 1C:
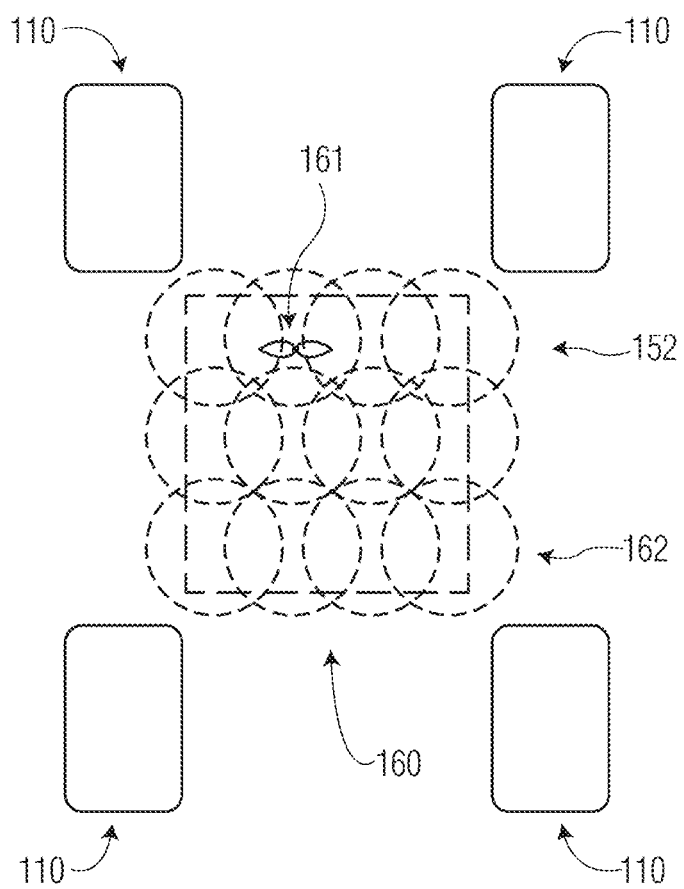
FIG. 1C illustrates a top-down view of a surface underneath an autonomous weed eradication vehicle, showing coverage area of a lighting array, in accordance with one or more embodiments herein.

In some embodiments, a high intensity illumination system may be positioned on or part of a device, such as a vehicle. An example of a vehicle 100 equipped with a high intensity illumination system comprising a lighting array 150 is illustrated in FIG. 1A, FIG. 1B, and FIG. 1C. The lighting array may comprise one or more light emitters 151, such as light emitting diodes (LEDs), configured to emit light 152 toward a surface 160. As illustrated in FIG. 1A, FIG. 1B, and FIG. 1C, the lighting array 150 may be positioned on the underside of the vehicle 100 such that light 152 emitted from the lighting array illuminates a region of interest 162 on a surface underneath the vehicle. The vehicle may be capable of moving along the surface 160 using one or more wheels 110. The region of interest 162 may contain an object 161 to be targeted by the detection system 101. The surface may be a ground surface, such as in an agricultural or construction environment. For example, the agricultural surface may be a crop field or a greenhouse. In some embodiments, the vehicle may be further equipped with a detection system 101 comprising a camera for imaging a region of the surface illuminated by the high intensity illumination system. For example, an autonomous vehicle configured to image, detect, identify, locate, and/or eradicate weeds in a crop field may be equipped with a high intensity illumination system to imaging, detection, identification, and/or location of the weeds.

Lighting Arrays

Figure 5A:
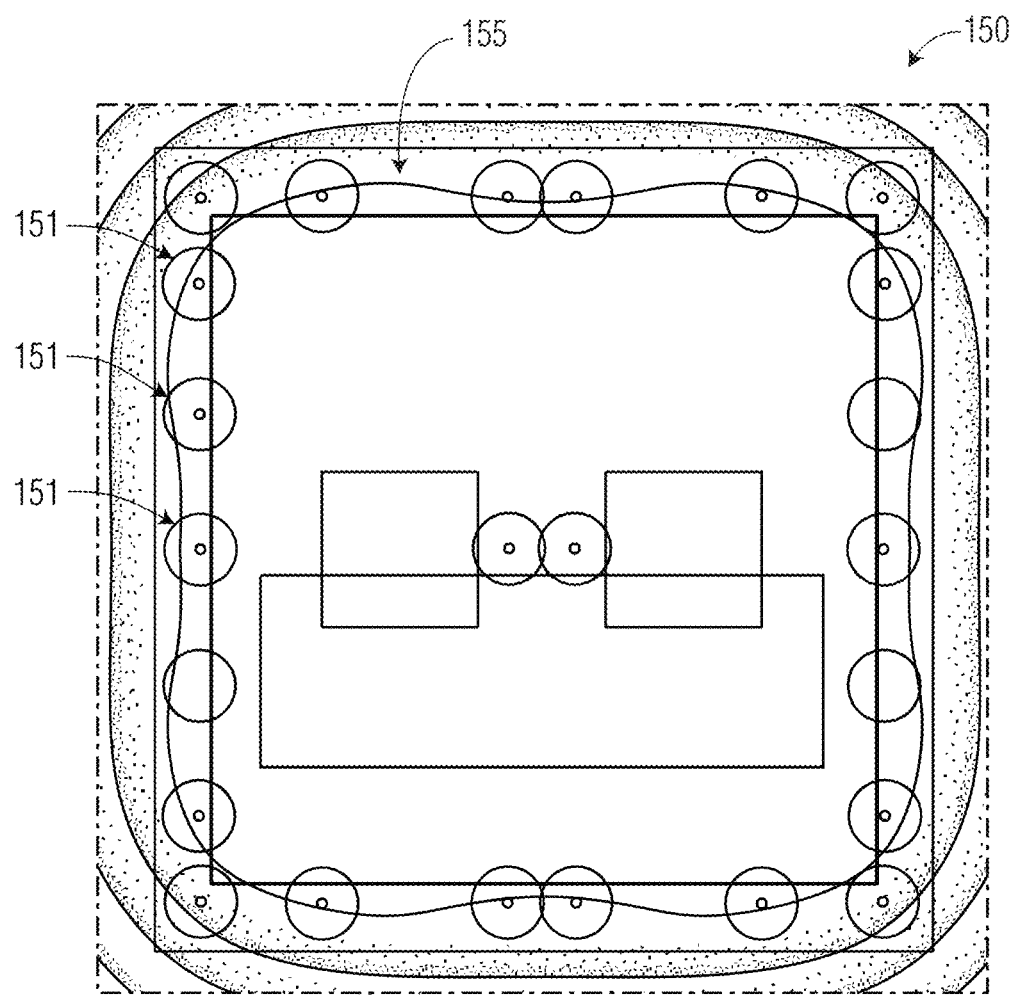
FIG. 5A schematically illustrates a bottom view of a lighting array for a high intensity illumination system, in accordance with one or more embodiments herein.
Figure 5B:
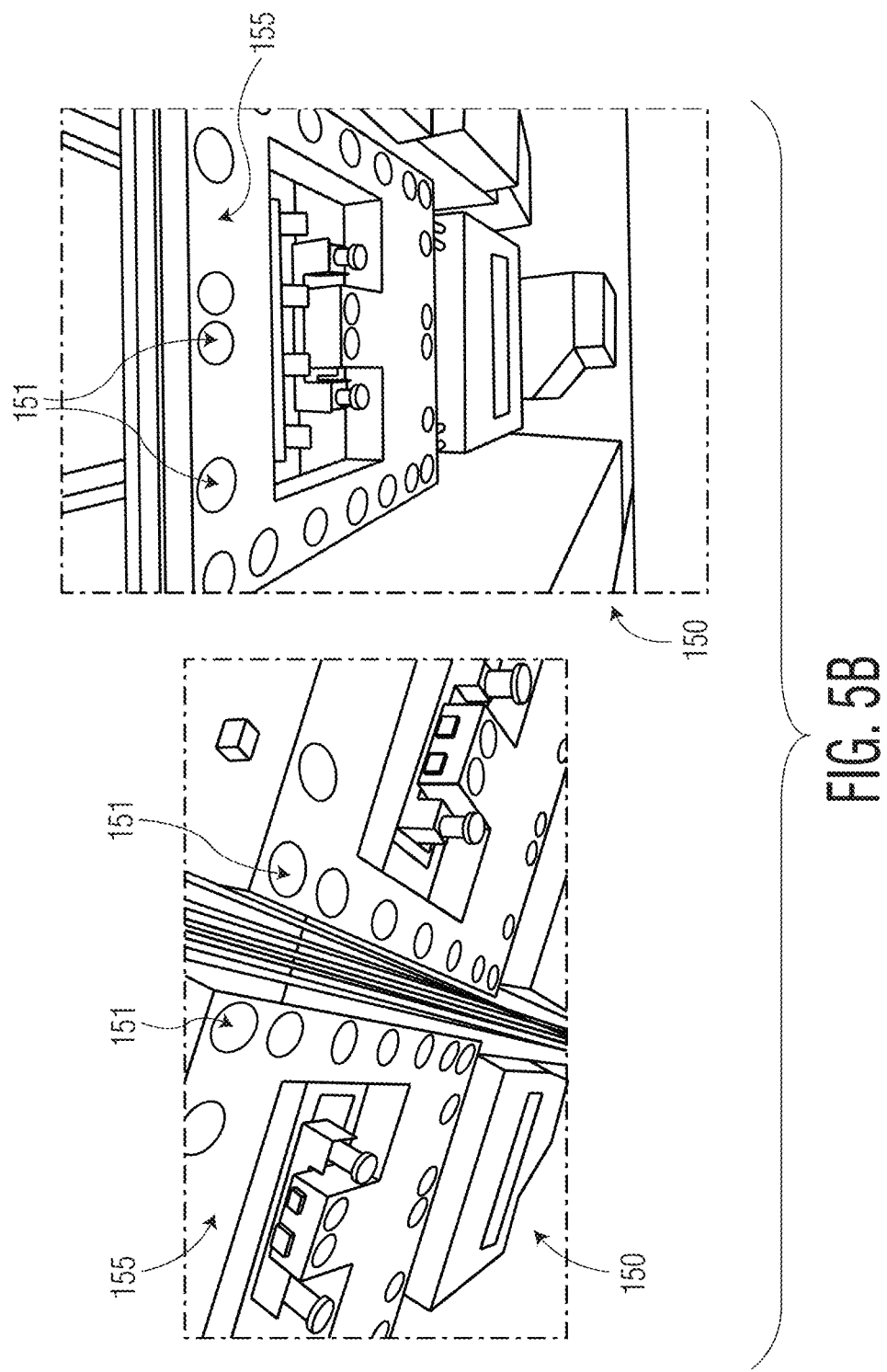
FIG. 5B schematically illustrates an isometric bottom view of a lighting array for a high intensity illumination system, in accordance with one or more embodiments herein.
Figure 6B:
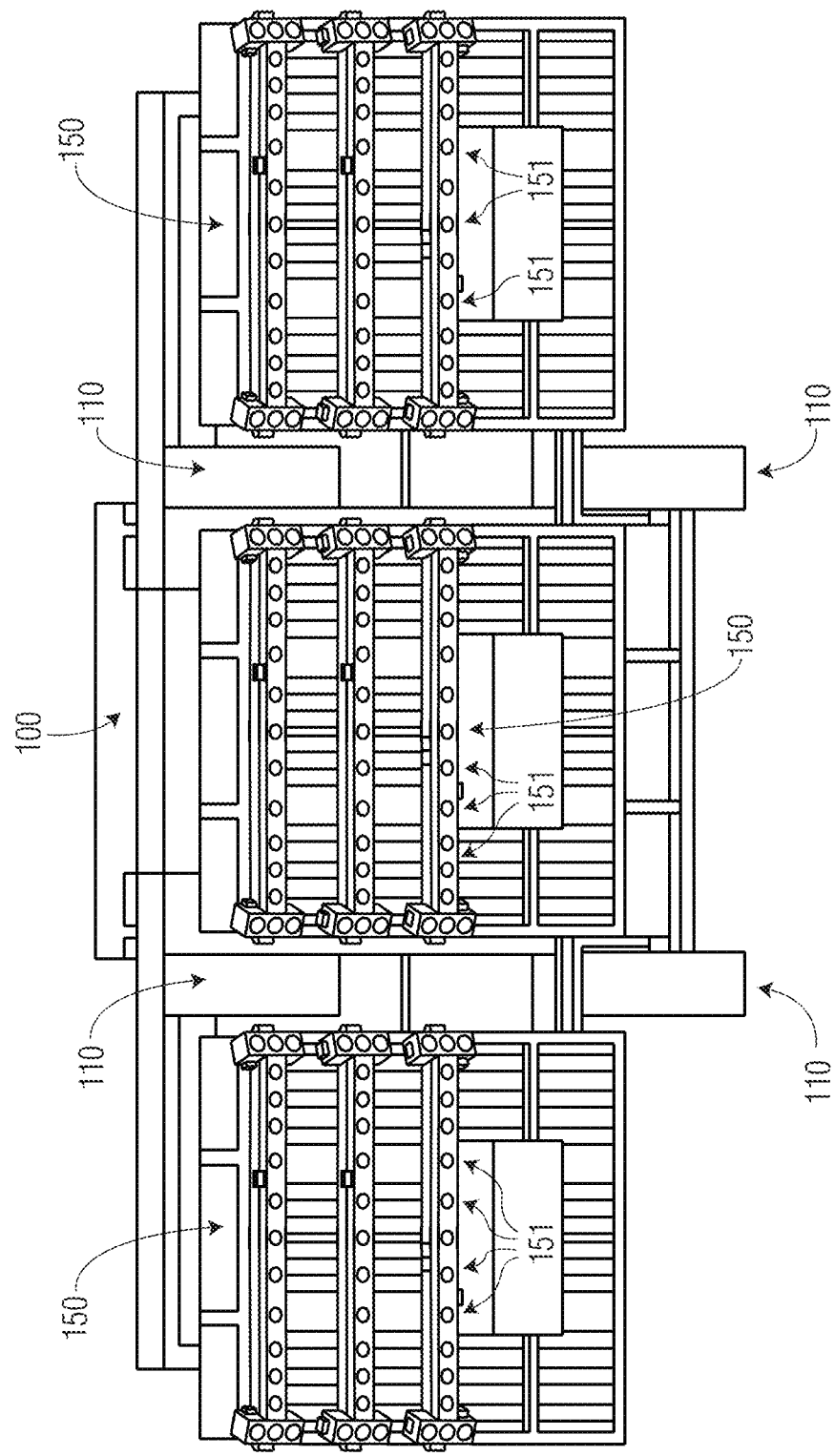
FIG. 6B schematically illustrates a bottom view of a vehicle with multiple lighting arrays for a high intensity illumination system configured on an autonomous weed eradication vehicle, in accordance with one or more embodiments herein.
Figure 8:
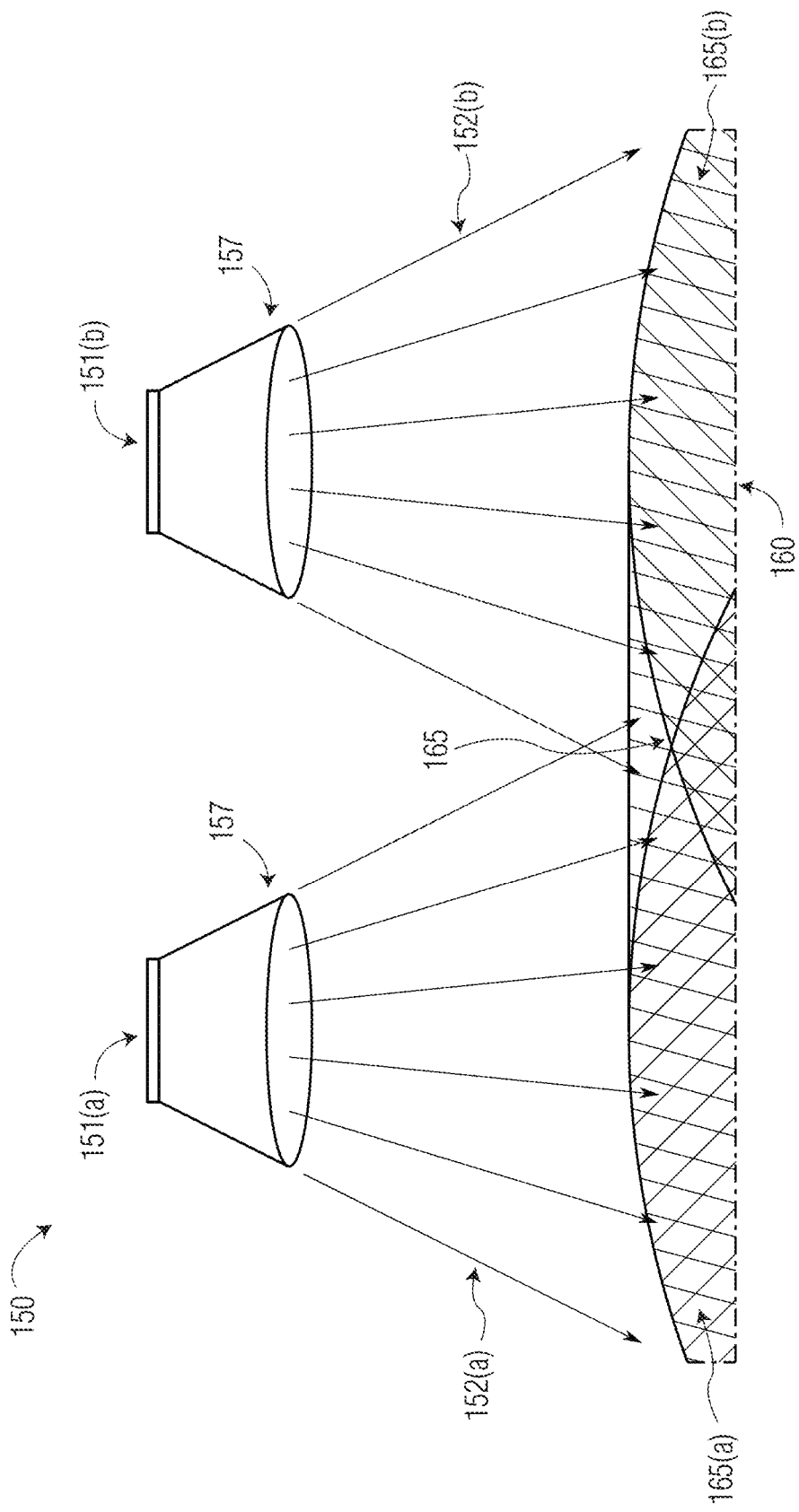
FIG. 8 schematically illustrates a surface illuminated with high intensity illumination, in accordance with one or more embodiments herein.

The high intensity illumination systems described herein may comprise one or more lighting arrays including an array of light emitters configured to evenly illuminate a surface. Examples of lighting arrays 150 comprising one or more light emitters 151, such as LEDs, are shown in FIG. 5A, FIG. 5B, FIG. 6A, and FIG. 6B. FIG. 6B further illustrates multiple lighting arrays 150 arranged on a vehicle 100. FIG. 5A shows a bottom view of the lighting array 150, and FIG. 1B shows an isometric bottom view of the lighting array, for example as viewed from the underside of vehicle 100. FIG. 6A shows bottom view of different LED configurations for a lighting array 150. FIG. 6B shows a bottom view of a vehicle 100 equipped with multiple lighting arrays 150 to illuminate a surface underneath the vehicle. A lighting array may further comprise a heat sink 155 to dissipate heat generated by operating the light emitters 151 and a power level higher than a manufacturer's recommended voltage or higher than a safety rated voltage. In some embodiments, the light emitters 151 of a lighting array 150 may be arranged to define a closed area, such as a rectangular region, as seen in FIG. 5A and FIG. 6A. In some embodiments, the light emitters 151 of a lighting array 150 may be arranged to define other close areas, such as circular, oval, polygonal, or other shaped regions. The light emitters 151 of a lighting array 150 may be arranged to provide even illumination across a region of interest (e.g., a region imaged by a camera, such as region 162 of FIG. 1C) such that the sum of the illumination from a plurality of light emitters 151 of the lighting array 150 is even over the region of interest, as shown in FIG. 8. A light emitter 151 of a lighting array 150 may be surrounded by or positioned near a reflector 157 such that portions of the light 152 emitted by the light emitter that may not otherwise reach the surface are reflected toward the surface 160. In some embodiments, a reflector 157 may be configured to increase the amount of light 152 from the light emitter 151 that reaches the surface 160, spread the light 152 across the surface 160 such that the light more uniformly illuminates the surface, or combinations thereof. A reflector 157 may have a variety of shapes, including parabolic, hemispherical, elliptical, conical, cylindrical, curved, or portions or combinations thereof.

A plurality of light emitters 151 of a lighting array may be arranged to produce even illumination 165 over a region of surface 160 (e.g., region 162 of FIG. 1C). For example, a first light emitter 151(a) may emit a first light 152(a) to illuminate surface 160 with a first illumination 165(a), and a second light emitter 151(b) may emit a second light 152(b) to illuminate surface 160 with a second illumination 165(b), such that the total illumination 165 is even across a region of the surface 160. In some embodiments, the light emitter 151 arrangement may be determined using computer modeling or experimental testing. A computer simulation to determine a light emitter arrangement may identify an arrangement of light emitters that produces even illumination over the region of interest while considering parameters including geometrical constraints for light emitter placement on the lighting array 150, light dispersion from the light emitters, presence and/or type of reflectors, distance of the lighting array from the surface, size and/or shape of the region of interest, and combinations thereof. In some embodiments, the parameters that may be varied include position, number, and/or angle of light emitters, presence and/or type of reflectors, intensity of light emitters, or combinations thereof. The illumination may be the sum of illuminations from individual light emitters, as shown in FIG. 8. In some embodiments, the computer simulation may position the light emitters 151 to minimize an intensity variation across the region of interest of the surface 160. In some embodiments, a light emitter configuration may include linear, circular, rectangular, or irregular placements of light emitters, or combinations thereof. In some embodiments, light emitter placement may be constrained by a size or shape of a device (e.g., a vehicle) on which the array is positioned. In some embodiments, light emitter placement may be constrained by positions of additional components of the device such that the light emitters do not interfere with the additional components.

Control Systems

The high intensity illumination systems described herein may be controlled by a control system. The control system may control power to the light emitters (e.g., LEDs) of a lighting array and synchronize an on/off state of the LEDs to a camera shutter or exposure. An example of a control system 700 is provided in FIG. 7. A control system 700 may comprise a computer 701 configured to control a strobe circuit system 710 comprising a strobe control printed circuit board (PCB) 702. The strobe PCB may provide a strobe signal (e.g., a pulsed voltage) to a lighting array 703 (e.g., an LED array). The strobe control PCB 702 may further provide a camera trigger signal to one or more cameras 704. The one or more cameras may be part of a detection system 101. Optionally, the control system may further comprise a strobe driver PCB 705 comprising one or more capacitors 706 connected to the strobe control PCB 702 and the lighting array 703. The capacitors 706 of the PCB may accumulate charge while the light emitters of the lighting array 150 are in an off state and may discharge to turn on the light emitters. Since providing pulses of high wattage power to the light emitters of the lighting array 150 to turn them on and off may strain a power generation system, inclusion of the capacitors 706 may enable pulsed power while applying a more uniform load to the power generation system. For example, the capacitors 706 may provide pulsed power to the light emitters of a lighting array 150 while the power generation provides sustained power by charging the capacitors over time while the light emitters are off and discharging the capacitors to turn the light emitters on. Inclusion of the strobe driver PCB may reduce the peak power output of the power generation system compared to a system without a strobe driver PCB.

Figure 9:
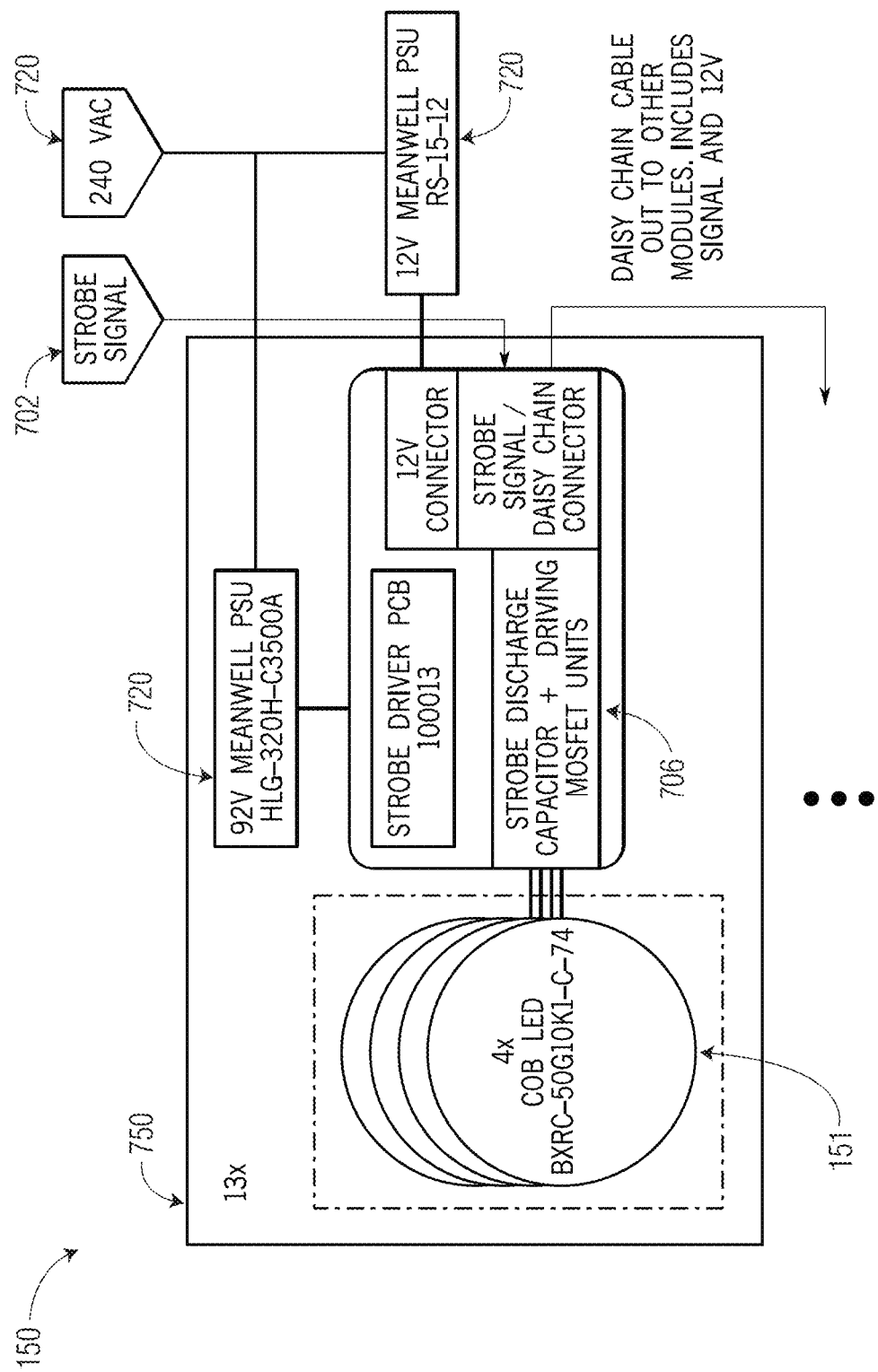
FIG. 9 schematically illustrates an electrical configuration for powering a high intensity illumination system, in accordance with one or more embodiments herein.

An example circuit configuration for controlling a lighting array 150 is provided in FIG. 9. A power supply unit (PSU) 720 may provide power to the strobe driver PCB 705. A strobe signal 702 may control charging and discharging of the capacitors of the strobe driver PCB 705, and the capacitors 706 may power the light emitters 151 when discharged. Individual lighting modules 750 may be chained together to form a lighting array 150.

Figure 7:
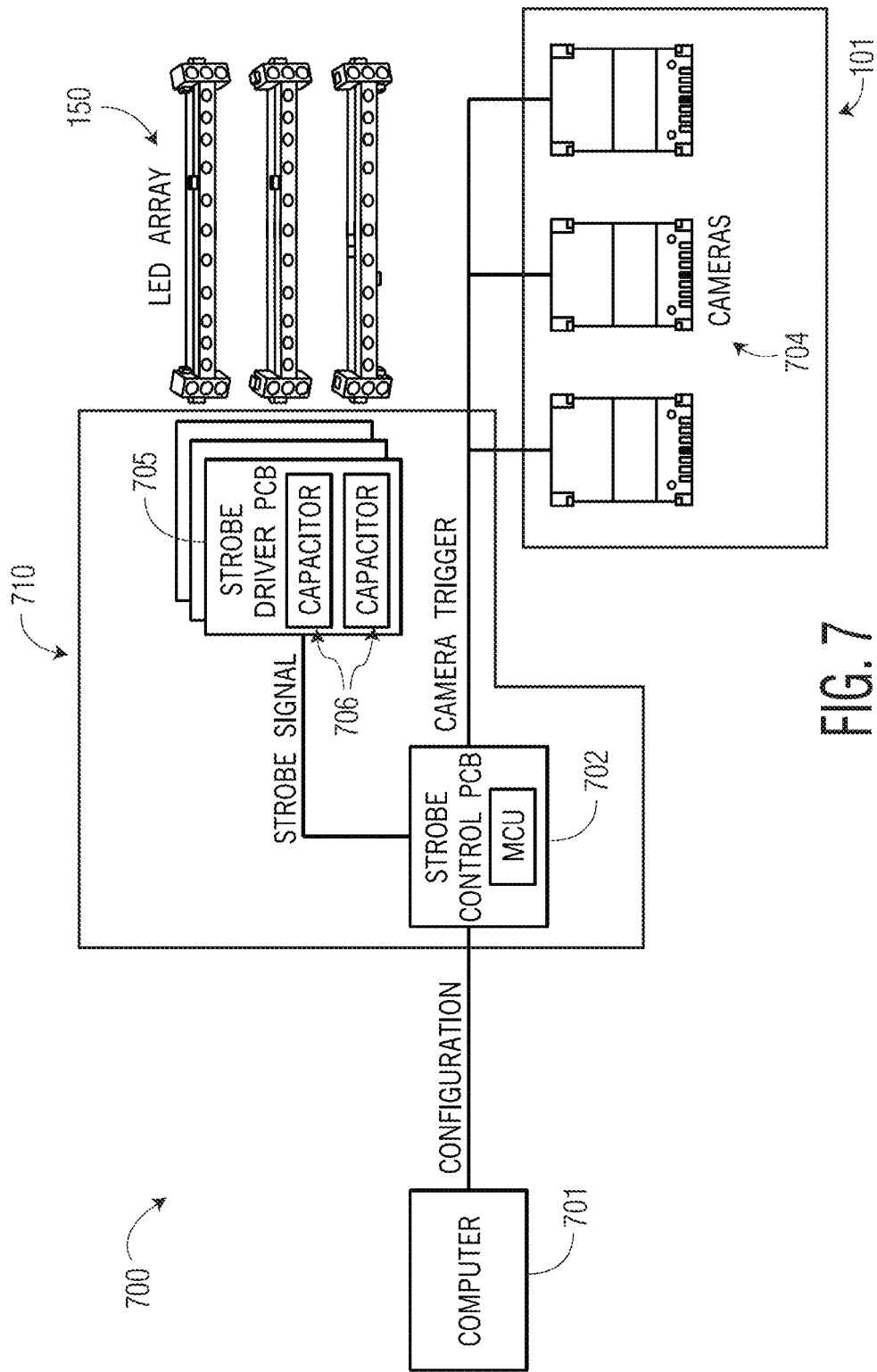
FIG. 7 schematically illustrates a system for synchronizing a high intensity illumination system and a detection system, in accordance with one or more embodiments herein.

A control system, such as control system 700 illustrated in FIG. 7, may be configured to provide a voltage to the lighting array that is sufficient to power the light emitters of the light array to illuminate a surface with an illuminance that is comparable to or brighter than the sun (e.g., an illuminance of at least 120,000 lux, at least 240,000 lux, at least 400,000 lux, or at least 600,000 lux). The voltage provided to the light emitters by the strobe PCB may be higher than a manufacturer's recommended voltage or higher than a safety rated voltage for the light emitters. In some embodiments, the voltage provided to the light emitters may be at least 1.2 times, at least 1.5 times, or at least 2 times the voltage at which the light emitters were designed to operate.

To compensate for the high voltage, the light emitters may be operated at a low duty ratio. Operating at a low duty ratio may reduce overheating caused by the high voltage and/or may extend the lifetime of the light emitters that may otherwise be shortened due to the high voltage. In some embodiments, the light emitters may be operated at a duty ratio of no more than 20%, no more than 15%, no more than 10%, no more than 7%, or from 2% to 15%. For example, a lighting array receiving double a recommended voltage may be operated at a duty ratio of no more than 10%. In some embodiments, the lighting array may further comprise a heat sink to dissipate excess heat and prolong the lifetime of the light emitters.

The duty ratio of the lighting array may be synchronized with a frame rate, shutter trigger, or exposure time of a camera. The camera may be configured to image a region illuminated by the lighting array. The strobe PCB may synchronize the lighting array and the camera such that the lighting array is on while the camera is collecting an image (e.g., while the camera shutter is open or while the camera is exposing a sensor chip). The camera may be operated with a fast frame rate (e.g., with an exposure time of no more than 1.5 ms or no more than 300 μs). The strobe PCB may cycle the lighting array on and off to produce a strobing effect that is synchronized with the camera frame rate and/or exposure time.

Object Targeting Systems and Methods

A high intensity illumination system of the present disclosure may be part of an object targeting system such as a weed eradication system. A weed eradication system comprising a high intensity illumination system may be configured to autonomously locate, target, and kill weeds in an agricultural setting (e.g., a crop field or a greenhouse). In some embodiments, the high intensity illumination system may improve the accuracy of the weed eradication system, increase the rate of weed detection by the weed eradication system, increase the speed at which the weed eradication system can travel, or combinations thereof. A weed eradication system comprising a high intensity illumination system of the present disclosure may be able to detect weeds in images collected at higher resolution and/or shorter exposure time than a weed eradication system lacking a high intensity illumination system (e.g., a weed eradication system operating under ambient lighting conditions).

In some embodiments, a detection system of the present disclosure, comprising a prediction system and a targeting system, may be configured to identify and target an object using point to point targeting methods. The prediction system may comprise a prediction sensor configured to image a region of interest, and the targeting system may comprise a targeting sensor configured to image a portion of the region of interest. Imaging may comprise collecting a representation (e.g., an image) of the region of interest or the portion of the region of interest.

Figure 10:
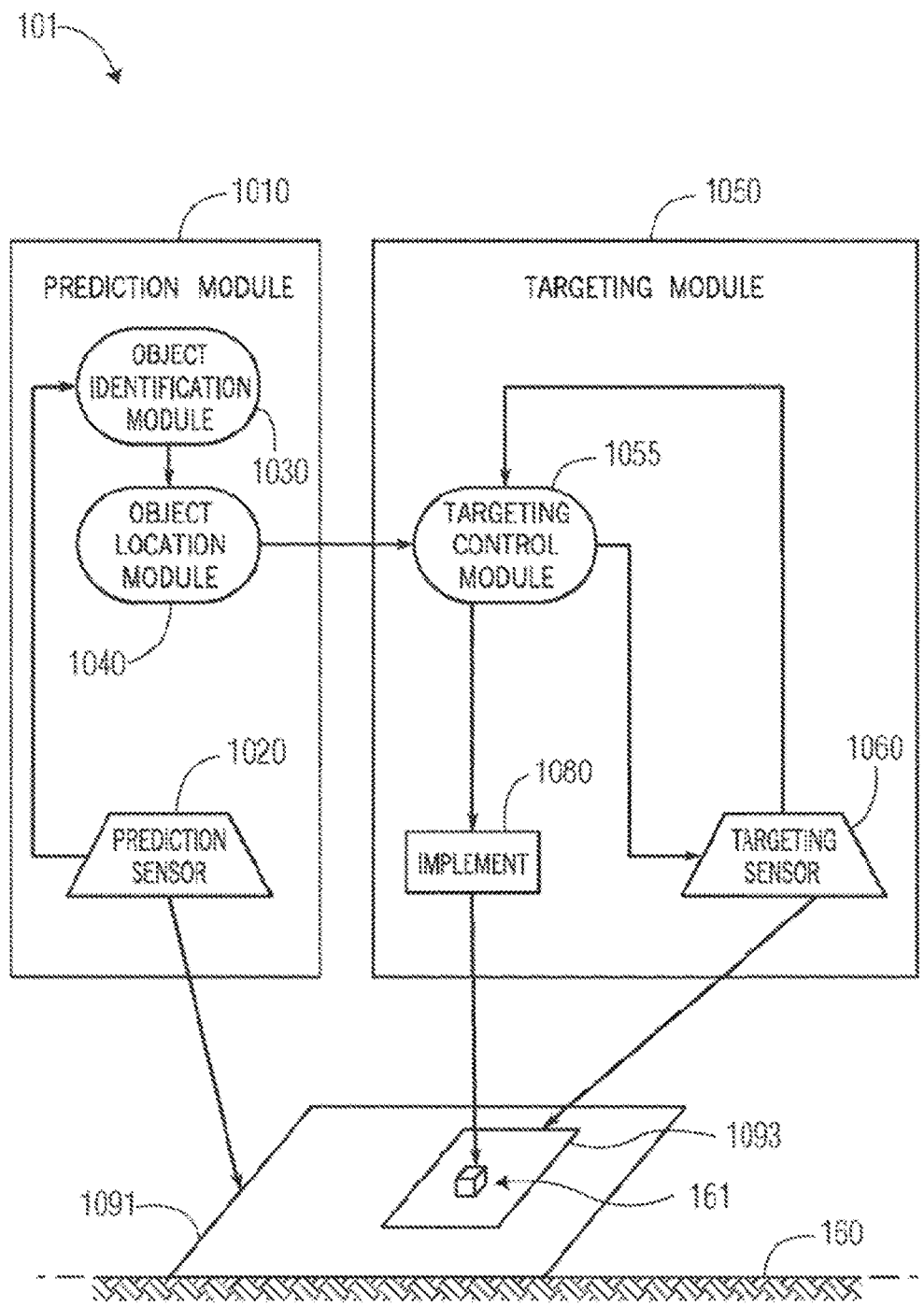
FIG. 10 depicts a system for identifying, locating, targeting, and manipulating an object, in accordance with one or more embodiments herein.

FIG. 10 schematically depicts a detection system 101 that may be used in conjunction with a high intensity illumination system to locate, and precisely target an object of interest 161. In some embodiments, a detection system may comprise an optical configuration depicted in FIG. 11A and FIG. 11B, as described herein. As illustrated in FIG. 10, the detection system 101, may be a multi-camera system, comprising a prediction module 1010 and a targeting module 1050. The detection system 101 may image a region of interest, such as prediction region of interest 1091, using a first sensor, such as a prediction sensor 1020. The prediction region of interest 1091 may be a region of a surface 160, such as the ground, a floor, or an agricultural field. The image may be a visible light image, an infrared image, an ultraviolet image, a light detection and ranging (LIDAR) image, an x-ray image, or any other electromagnetic image. The prediction sensor 1020 may be a camera, such as a charge-coupled device (CCD) camera or a complementary metal-oxide-semiconductor (CMOS) camera, a LIDAR detector, an infrared sensor, an ultraviolet sensor, an x-ray detector, or any other sensor capable of detecting electromagnetic waves.

An object identification module 1030 may receive the image from the prediction sensor 1020. The prediction module 1010 may determine the presence or absence of an object of interest 161 in an image of a region of interest, such as prediction region of interest 1091, collected by the prediction sensor 1020 using an object identification module 1030. The object identification module 1030 may identify objects of interest in the image and may differentiate objects of interest from other objects in the image. In some embodiments, the object identification module 1030 comprises an identification machine learning model trained to identify objects of interest based on features extracted from labeled images used for training the identification machine learning model. The machine learning model may be a deep learning model, such as a deep learning neural network. In some embodiments, the object identification module 1030 may implement a heuristic model, thresholding, or a classical detection algorithm to identify the object. In some embodiments, the object identification module identifies the object using spectroscopic data.

The object identification module may be configured to identify a plant and to differentiate between different plants, such as between a crop and a weed, for example using a machine learning model. In some embodiments, the machine learning model may be a deep learning model, such as a deep learning neural network. In some embodiments, the object identification module may utilize identification machine learning model, such as a convolutional neural network. The identification machine learning model may be trained with many images for surfaces with or without objects of interest. For example, the machine learning model may be trained with images of fields with or without weeds. Once trained, the machine learning model may be configured to identify a region in the image containing an object of interest. The region may be defined by a polygon, for example a rectangle. In some embodiments, the region is a bounding box. In some embodiments, the region is a polygon mask covering an identified region. In some embodiments, the identification machine learning model may be trained to determine a location of the object of interest, for example a pixel location within a prediction image.

The location of the identified object may be communicated to an object location module 1040. The object location module 1040 may send the location of the object 161 to a targeting module 1050. In some embodiments, a detection system may lack a prediction module 1010 and the location of the object 161 may be determined directly from an image collected by the targeting sensor. In some embodiments, the targeting module 1050 is one of a plurality of targeting modules, and the targeting module 1050 may be selected based on availability of the targeting module or proximity of the targeting module to the object location.

A targeting control module 1055 of the targeting module 1050 may control the position, orientation, or direction of a targeting sensor 1060. In some embodiments, the targeting control module 1055 may control the position, orientation, or direction of the targeting sensor 1060 by moving an actuator that adjusts the position or orientation of the targeting sensor 1060. In some embodiments, the targeting control module 1055 may control the position, orientation, or direction of the targeting sensor 1060 by moving an actuator that adjusts the position or orientation of a reflective surface that directs electromagnetic waves to or from the targeting sensor 1060.

The targeting sensor 1060, the position, orientation, or direction of which may be adjusted by the targeting control module 1055 to point toward the object location, may collect an additional image of a region of interest, such as targeting region of interest 1093, containing the object of interest 161. The targeting region of interest 1093 may cover a portion of the prediction region of interest 1091 imaged by the prediction sensor 1020. The additional image may be used to confirm or update the location of the object of interest 161. Optionally, the targeting control module 1055 may adjust the position, orientation, or direction of an implement 1080 based on the location of the object 161 in an additional image collected by the targeting sensor. In some embodiments, the targeting control module 1055 may adjust the position, orientation, or direction of the implement 1080 by moving an actuator that adjusts the position or orientation of the implement 1080. In some embodiments, the targeting module may activate or inactivate select implements within an array of implements such that the object is selectively targeted.

The implement 1080 may perform an action on the object 161 by directing the implement toward the object location. For example, the implement 1080 may be a laser that emits laser light toward the object 161. In another example, the implement 1080 may be a grabbing tool that grabs the object 161. In another example, the implement 1080 may be a spraying tool that sprays a fluid at the object 161. In some embodiments, the implement 1080 may be a planting tool that plants a plant at the identified location. In some embodiments, the implement 1080 may be a harvesting tool that harvests the object 161. In some embodiments, the implement 1080 may be a pollinating tool that pollinates the object 161. In some embodiments, directing the implement toward the object location may comprise activating or inactivating select implements within an array of implements, such that the object is selectively targeted.

The detection system of an object targeting system comprising a high intensity illumination system may be configured to locate and target an object of interest. In some embodiments, a detection system may be used to target an object of interest identified in an image or representation collected by a sensor, such as a camera. The location of the object may be determined based on the image, and the object may be targeted at the determined location. Targeting the object may comprise precisely locating the object using the targeting sensor and targeting the object with an implement. For example, the detection system may comprise as a laser optical system to direct laser illumination toward the targeted object at a location determined by the object detection system.

Figure 11A:
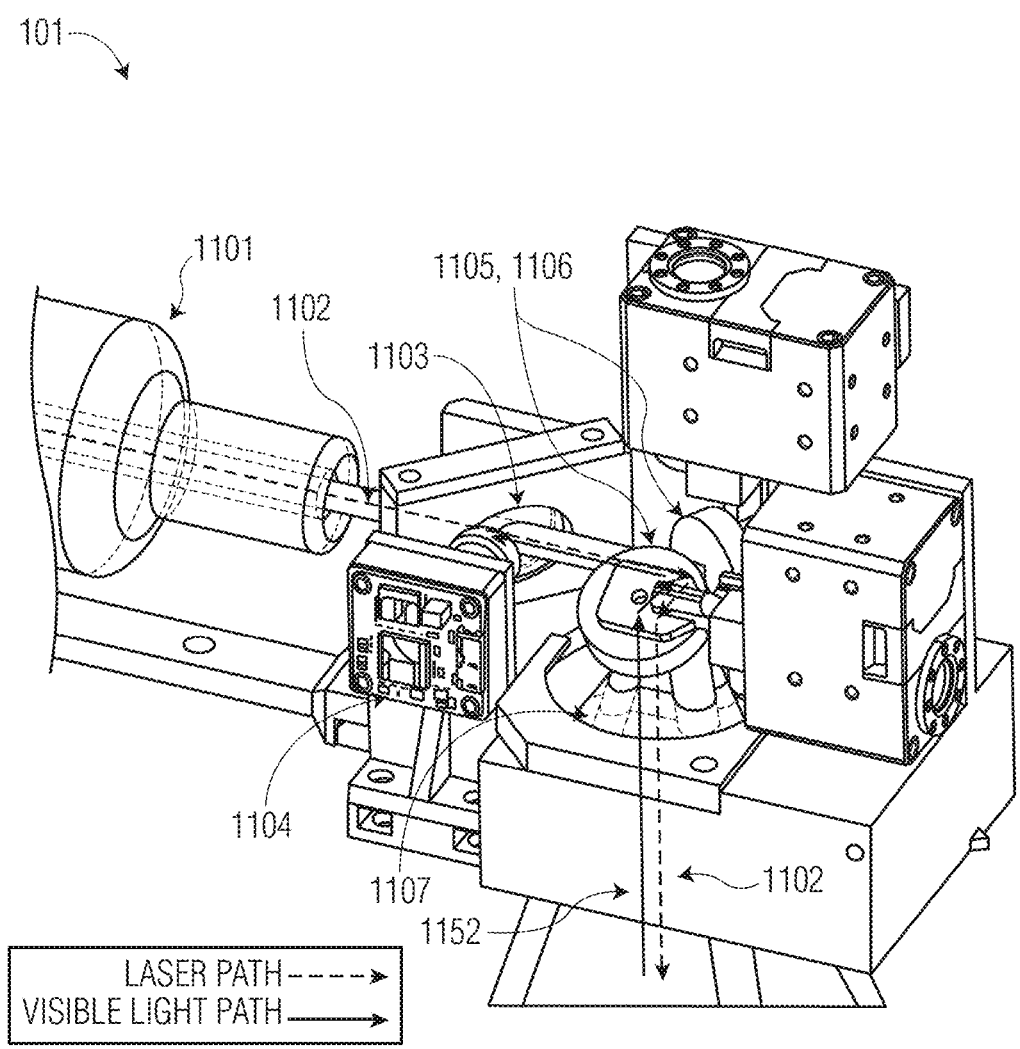
FIG. 11A illustrates an isometric view of a portion of a detection system with the laser path and visible light path indicated, in accordance with one or more embodiments herein.
Figure 11B:
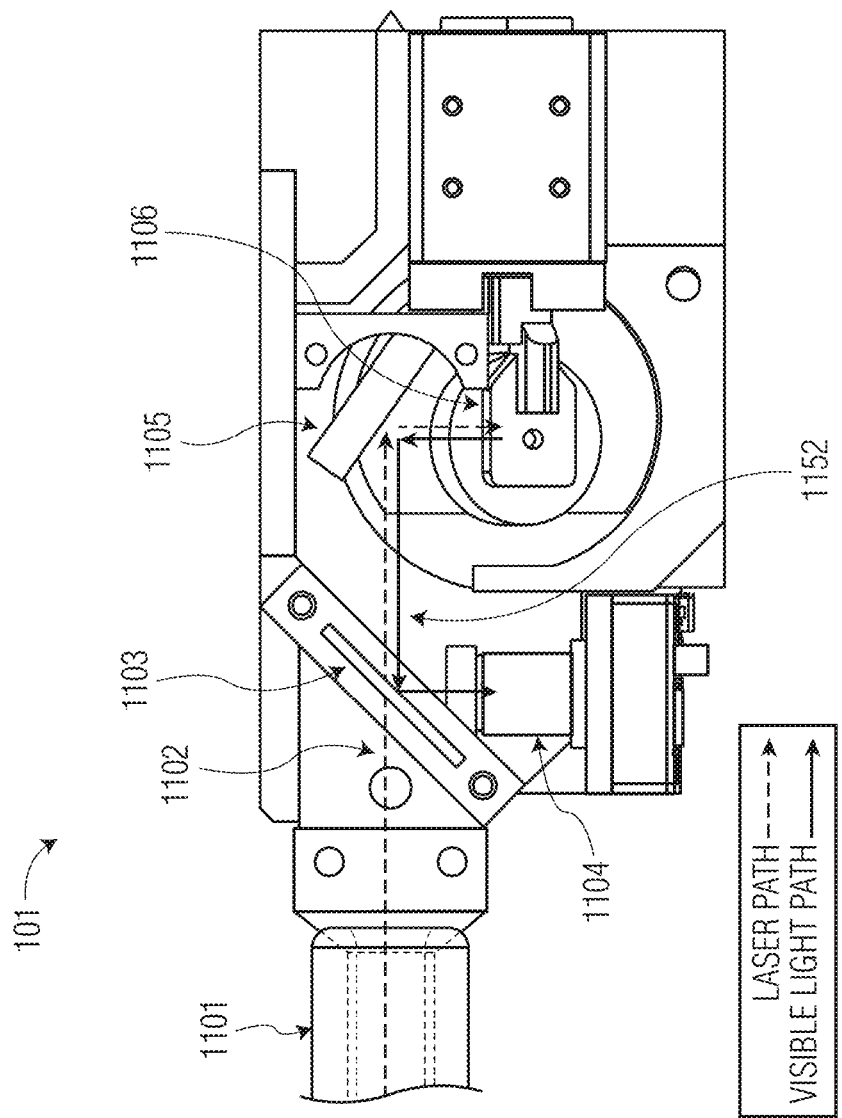
FIG. 11B illustrates a top view of a portion of a detection system with the laser path and visible light path indicated, in accordance with one or more embodiments herein.

An object targeting system may be configured to direct a beam, for example a light beam, toward a target location on a surface, such as a location of an object of interest. Referring to FIG. 11A and FIG. 11B, an exemplary object targeting system comprising a detection system will now be described. In the illustrated embodiments, the implement is a laser. However, other implements are within the scope of the present disclosure, including but not limited to a grabbing implement, a spraying implement, a planting implement, a harvesting implement, a pollinating implement, a marking implement, a blowing implement, or a depositing implement. In some embodiments, the implement may comprise an array of implements that may be selectively activated or inactivated to target the location of an object of interest. For example, an implement may comprise an array of sprayers, and each sprayer in the array is activated or inactivated depending on the location of the object of interest such that the location of an object of interest is selectively sprayed.

FIG. 11A illustrates an isometric view of an embodiment of a detection system 101 as disclosed herein. An emitter 1101, such as a laser, is configured to direct a beam along an optical path, for example a laser path 1102. In some embodiments, the beam comprises electromagnetic radiation, for example light, radio waves, microwaves, or x-rays. In some embodiments, the light is visible light, infrared light, or ultraviolet light. The beam may be coherent. In one embodiment, the emitter is a laser, such as an infrared laser.

One or more optical elements may be positioned in a path of the beam. The optical elements may comprise one or more of a beam combiner 1103, a first reflective element 1105, and a second reflective element 1106. The elements may be configured in the order of the beam combiner 1103, followed by the first reflective element 1105, followed by the second reflective element 1106, in the direction of the beam path. In another example, one or both of the first reflective element 1105 or the second reflective element 1106 may be configured before the beam combiner 1103, in order of the direction of the beam path. In another example, the optical elements may be configured in the order of the beam combiner 1103, followed by the first reflective element 1105 in order of the direction of the beam path. In another example, one or both of the first reflective element 1105 or the second reflective element 1106 may be configured before the beam combiner 1103, in the direction of the beam path. Any number of additional reflective elements may be positioned in the beam path. The beam may pass through a laser escape window 1107. The laser escape window 1107 may be transparent and may protect the other optical elements from dust.

The beam combiner 1103 may also be referred to as a beam combining element. In some embodiments, the beam combiner 1103 may be a zinc selenide (ZnSe), zinc sulfide (ZnS), or germanium (Ge) beam combiner. For example, the beam combiner 1103 may be configured to transmit infrared light and reflect visible light. In some embodiments, the beam combiner 1103 may be a dichroic. In some embodiments, the beam combiner 1103 may be configured to pass electromagnetic radiation having a wavelength longer than a cutoff wavelength and reflect electromagnetic radiation having a wavelength shorter than the cutoff wavelength. In some embodiments, the beam combiner may be configured to pass electromagnetic radiation having a wavelength shorter than a cutoff wavelength and reflect electromagnetic radiation having a wavelength longer than the cutoff wavelength. In some embodiments, the beam combiner may be a polarizing beam splitter, a long pass filter, a short pass filter, or a band pass filter.

An optical control system of the present disclosure may further comprise a lens positioned in the optical path. In some embodiments, a lens may be a focusing lens positioned such that the focusing lens focuses the beam, the scattered light, or both. For example, a focusing lens may be positioned in the visible light path to focus the scattered light onto the targeting camera. In some embodiments, a lens may be a defocusing lens positioned such that the defocusing lens defocuses the beam, the scattered light, or both. In some embodiments, the lens may be a collimating lens positioned such that the collimating lens collimates the beam, the scattered light, or both. In some embodiments, two or more lenses may be positioned in the optical path. For example, two lenses may be positioned in in the optical path in series to expand or narrow the beam.

The positions and orientations of one or both of the first reflective element 1105 and the second reflective element 1106 may be controlled by actuators. In some embodiments, an actuator may be a motor, a solenoid, a galvanometer, or a servo. For example, the position of the first reflective element 1105 may be controlled by a first actuator, and the position and orientation of the second reflective element 1106 may be controlled by a second actuator. In some embodiments, a single reflective element may be controlled by a plurality of actuators. For example, the first reflective element 1105 may be controlled by a first actuator along a first axis and a second actuator along a second axis. In some embodiments, a single actuator may control a reflective element along a plurality of axes.

An actuator may change a position of a reflective element by rotating the reflective element, thereby changing an angle of incidence of a beam encountering the reflective element. Changing the angle of incidence may cause a translation of the position at which the beam encounters the surface. In some embodiments, the angle of incidence may be adjusted such that the position at which the beam encounters the surface is maintained while the optical system moves with respect to the surface. An actuator may be servo-controlled, piezoelectric actuated, piezo inertial actuated, stepper motor-controlled, galvanometer-driven, linear actuator-controlled, or any combination thereof. A reflective element may be a mirror; for example, a dichroic mirror, or a dielectric mirror; a prism; a beam splitter; or any combination thereof. In some embodiments, a reflective element may be any element capable of deflecting the beam.

FIG. 11B shows a top view of an embodiment of a detection system 101 as shown in FIG. 11A. As seen in FIG. 11A, the camera 1104 may be positioned to capture light, for example visible light, traveling along a visible light path 1152 in a direction opposite the beam path, for example laser path 1102. The light may be scattered by a surface, such as the surface with an object of interest, or an object, such as an object of interest, and travel toward the targeting camera 1104 along visible light path 1152. In some embodiments, the camera 1104 is positioned such that it captures light reflected off of the beam combiner 1103. In other embodiments, the camera 1104 is positioned such that it captures light transmitted through the beam combiner 1103. With the capture of such light, the camera 1104 may be configured to image a region of interest on a surface. The camera 1104 may be coupled to the beam combiner 1103, or the camera 1104 may be coupled to a support structure supporting the beam combiner 1103. In one embodiment, the camera 1104 does not move with respect to the beam combiner 1103, such that the targeting camera 1104 maintains a fixed position relative to the beam combiner 1103.

The high intensity illumination systems described herein, or the object targeting systems described herein, may be part of an autonomous weed eradication system to target and eliminate weeds. For example, an autonomous weed eradication system may be used to target a weed of interest identified and/or located in an image or representation collected by a sensor, such as a sensor. Targeting the weed may comprise precisely locating the weed using the sensor, targeting the weed with a laser, and eradicating the weed by burning it with laser light, such as infrared light. The high intensity illumination system may improve the accuracy of the weed targeting by enabling shorter camera frame rates, shorter image exposure times, higher resolution imaging, or combinations thereof.

Figure 12:
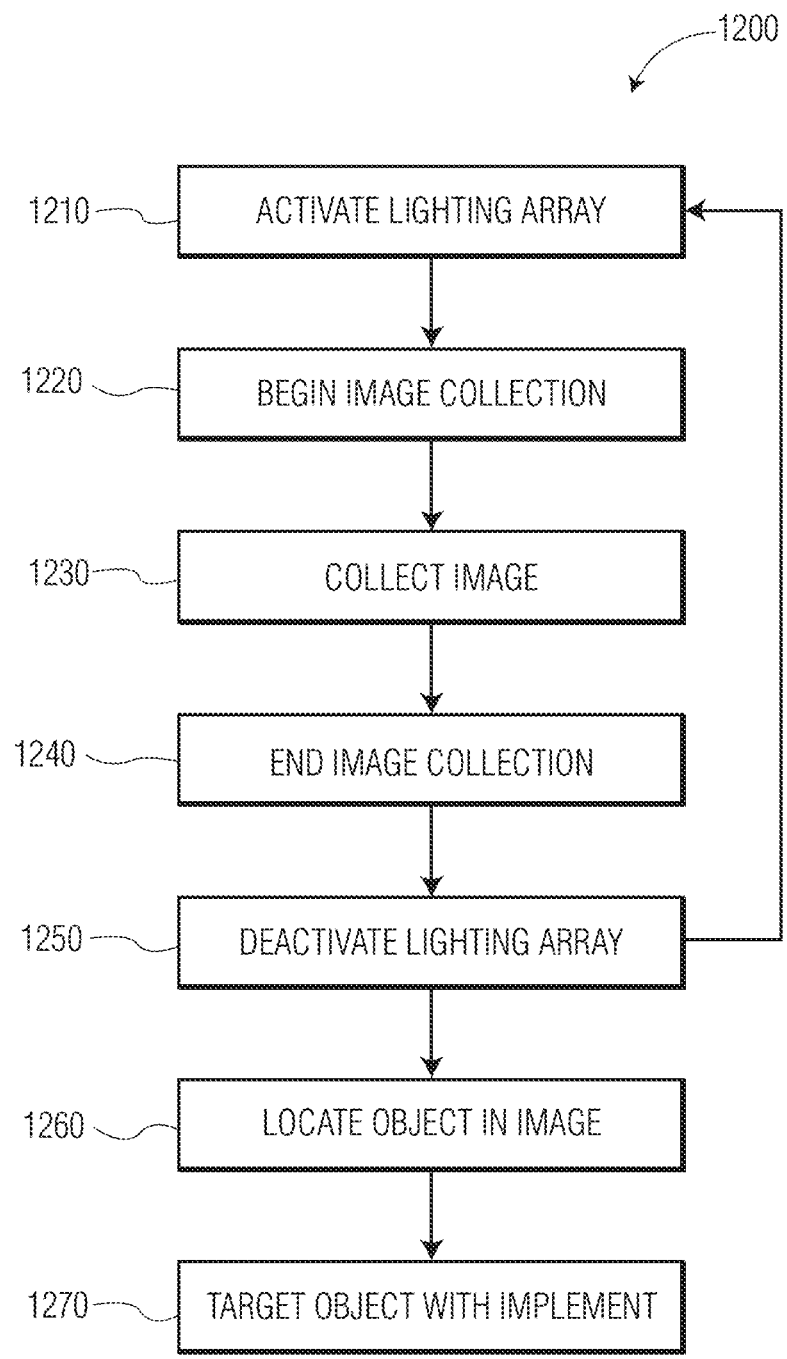
FIG. 12 schematically illustrates a method of targeting an object using a high intensity illumination system, in accordance with one or more embodiments herein.

A method 1200 of targeting an object using a high intensity illumination system of the present disclosure is illustrated in FIG. 12. Such a method may be implemented using a lighting array as described herein, such as lighting array 150 illustrated in FIG. 5A, FIG. 5B, FIG. 6A, or FIG. 6B. The object may be detected using a detection system as described herein, such as detection system 101 illustrated in FIG. 10. In some embodiments, both the lighting array and the object detection system may be coupled to a vehicle, such as an autonomous weed eradication vehicle, as illustrated in FIG. 1A, FIG. 1B, and FIG. 1C to detect an object 161 (e.g., a weed) located on a surface 160 (e.g., the ground). At step 1210 of method 1200, the lighting array may be activated. Upon activation, the lighting array may illuminate a region of interest on the surface with high intensity illumination. At step 1220, the detection system may begin collecting an image of a region of interest illuminated by the lighting array. Beginning image collection and activation of the lighting array may happen substantially simultaneously. In some embodiments, activating the lighting array and beginning image collection may happen within about 0.1 µs, about 1 µs, about 10 µs, or about 0.1 ms of each other. In some embodiments, activation of the lighting array may occur before beginning image collection. Activation of the lighting array may occur no more than about 0.1 µs, about 1 µs, about 10 µs, or about 0.1 ms before beginning image collection. In some embodiments, beginning image collection may occur before activation of the lighting array. Beginning image collection may occur no more than about 0.1 µs, about 1 µs, about 10 µs, or about 0.1 ms before activation of the lighting array.

An image of the region of interest may be collected at step 1230 to produce an image of the region of interest. Image collection may correspond to a period of time between beginning image collection and ending image collection, which may be referred to as an exposure time of the image. At step 1240, the detection system may end image collection of the region of interest, and at step 1250, the lighting array may be deactivated. Ending image collection and deactivation of the lighting array may happen substantially simultaneously. In some embodiments, deactivating the lighting array and ending image collection may happen within about 0.1 µs, about 1 µs, about 10 µs, or about 0.1 ms of each other. In some embodiments, deactivation of the lighting array may occur before ending image collection. Deactivation of the lighting array may occur no more than about 0.1 µs, about 1 µs, about 10 µs, or about 0.1 ms before ending image collection. In some embodiments, ending image collection may occur before deactivation of the lighting array. Ending image collection may occur no more than about 0.1 µs, about 1 µs, about 10 µs, or about 0.1 ms before deactivation of the lighting array.

The steps of activating the lighting array (step 1210), beginning image collection (step 1220), collecting an image (step 1230), ending image collection (step 1240), and deactivating the lighting array (step 1250) may be repeated to collect a series of images (e.g., a video). The steps may be repeated at a rate corresponding to a frame rate, also referred to as a camera frame rate or a video frame rate. In some embodiments, a frame rate may be measured as a time between beginning collection of consecutive image frames, i.e., a time between beginning collection of a first image frame and beginning collection of a second, subsequent image frame.

At step 1260 an object, such as object 161 in FIG. 1C, may be located in an image collected in step 1230 or in a series of images collected by repeating steps 1210, 1220, 1230, 1240, and 1250. Use of the high intensity illumination system may improve the accuracy of object location in the image by improving image quality, such as by providing more even illumination over the region of interest captured in the image, enabling faster frame rates, enabling shorter frame times, enabling higher image resolution, or combinations thereof. The object may be targeted with an implement at step 1270 based on the location determined in step 1260. For example, the object may be a weed that is targeted with a laser implement to burn the weed. In another example, the object may be a plant (e.g., a crop or a weed) that is sprayed with a spraying implement. In another example, the object may be moved with a grabbing implement. In some embodiments, the implement may comprise an array of implements, and targeting the object may comprise selectively activating or inactivating individual implements within the array to target object of interest. For example, an implement may comprise an array of sprayers, and each sprayer in the array is activated or inactivated depending on the location of the object of interest such that the location of an object of interest is selectively sprayed.

Figure 13A:
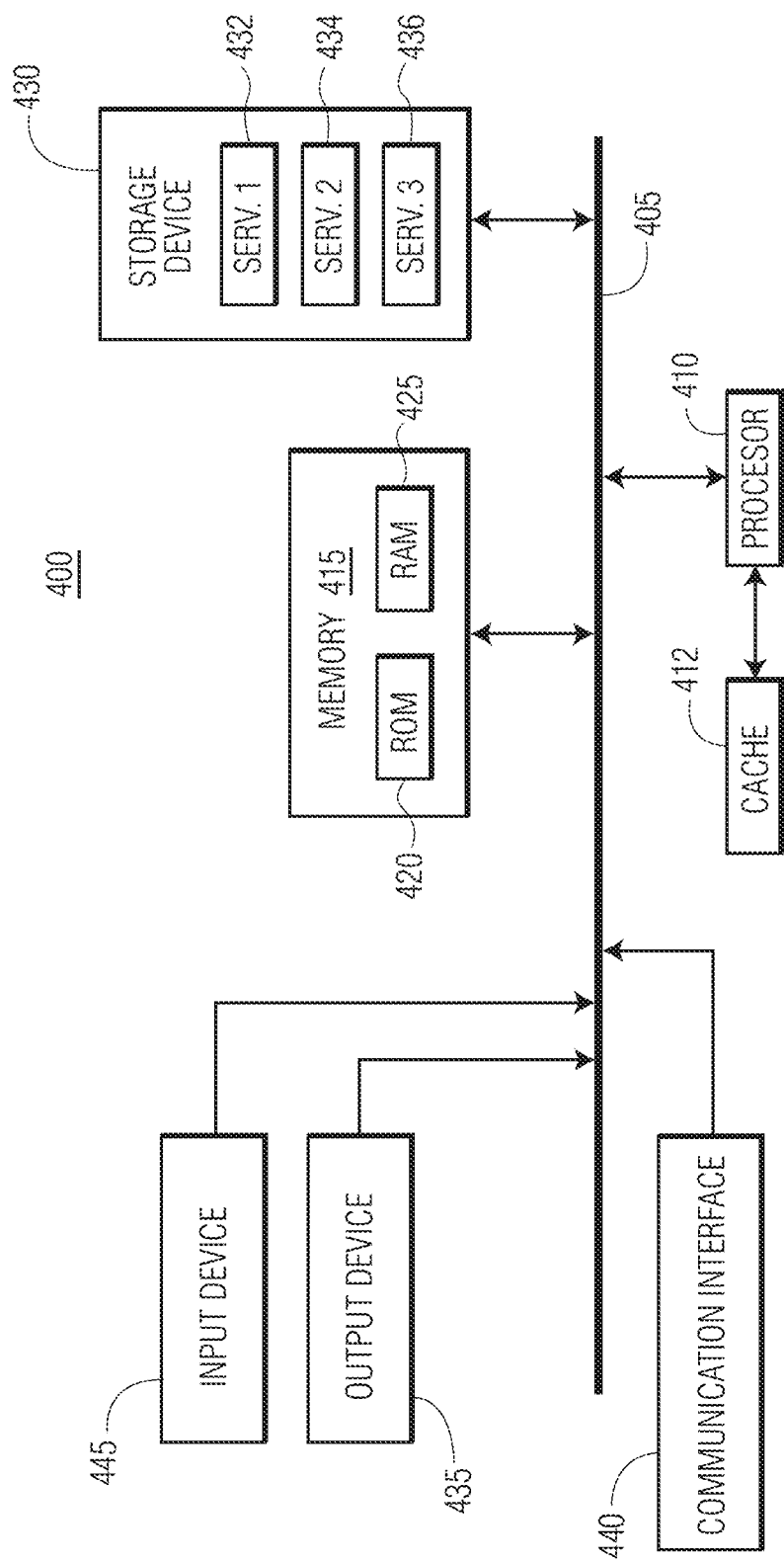
FIG. 13A is a block diagram illustrating a computing device, according to example embodiments.

FIG. 13A illustrates a system bus architecture of computing system 400, according to example embodiments. System 400 may be representative of at least a portion of detection system 101 or control system 700. For example, system 400 may be representative of at least a portion of computer 701 of control system 700. One or more components of system 400 may be in electrical communication with each other using a bus 405. System 400 may include a processing unit (CPU or processor) 410 and a system bus 405 that couples various system components including the system memory 415, such as read only memory (ROM) 420 and random access memory (RAM) 425, to processor 410. System 400 may include a cache of high-speed memory connected directly with, in close proximity to, or integrated as part of processor 410. System 400 may copy data from memory 415 and/or storage device 430 to cache 412 for quick access by processor 410. In this way, cache 412 may provide a performance boost that avoids processor 410 delays while waiting for data. These and other modules may control or be configured to control processor 410 to perform various actions. Other system memory 415 may be available for use as well. Memory 415 may include multiple different types of memory with different performance characteristics. Processor 410 may include any general purpose processor and a hardware module or software module, such as service 1 432, service 2 434, and service 3 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing system 400, an input device 445 may represent any number of input mechanisms, such as a microphone for speech, a touch-sensitive screen for gesture or graphical input, keyboard, mouse, motion input, speech and so forth. An output device 435 may also be one or more of a number of output mechanisms known to those of skill in the art. In some instances, multimodal systems may enable a user to provide multiple types of input to communicate with computing system 400. Communications interface 440 may generally govern and manage the user input and system output. There is no restriction on operating on any particular hardware arrangement and therefore the basic features here may easily be substituted for improved hardware or firmware arrangements as they are developed.

Storage device 430 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 may include services 432, 434, and 436 for controlling the processor 410. Other hardware or software modules are contemplated. Storage device 430 may be connected to system bus 405. In one aspect, a hardware module that performs a particular function may include the software component stored in a computer-readable medium in connection with the necessary hardware components, such as processor 410, bus 405, output device 435 (e.g., display), and so forth, to carry out the function.

Figure 13B:
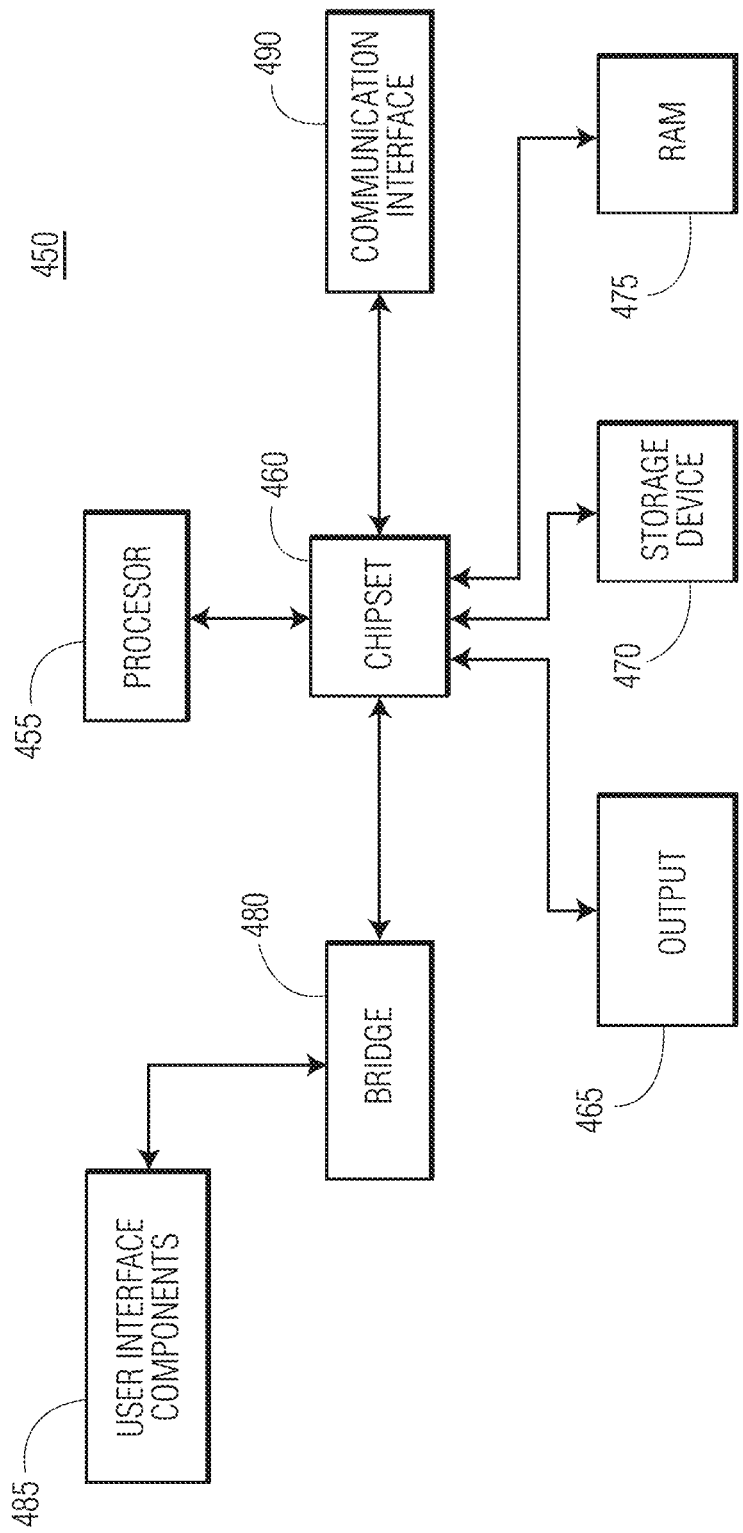
FIG. 13B is a block diagram illustrating a computing device, according to example embodiments.

FIG. 13B illustrates a computer system 450 having a chipset architecture that may represent at least a portion of detection system 140 or control system 700. For example, system 400 may be representative of at least a portion of computer 701 of control system 700. Computer system 450 may be an example of computer hardware, software, and firmware that may be used to implement the disclosed technology. System 450 may include a processor 455, representative of any number of physically and/or logically distinct resources capable of executing software, firmware, and hardware configured to perform identified computations. Processor 455 may communicate with a chipset 460 that may control input to and output from processor 455. In this example, chipset 460 outputs information to output 465, such as a display, and may read and write information to storage device 470, which may include magnetic media, and solid state media, for example. Chipset 460 may also read data from and write data to storage device 475 (e.g., RAM). A bridge 480 for interfacing with a variety of user interface components 485 may be provided for interfacing with chipset 460. Such user interface components 485 may include a keyboard, a microphone, touch detection and processing circuitry, a pointing device, such as a mouse, and so on. In general, inputs to system 450 may come from any of a variety of sources, machine generated and/or human generated.

Chipset 460 may also interface with one or more communication interfaces 490 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 455 analyzing data stored in storage device 470 or storage device 475. Further, the machine may receive inputs from a user through user interface components 485 and execute appropriate functions, such as browsing functions by interpreting these inputs using processor 455.

It may be appreciated that example systems 400 and 450 may have more than one processor 410 or be part of a group or cluster of computing devices networked together to provide greater processing capability.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

As used herein, the terms "about" and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

EXAMPLES

The invention is further illustrated by the following non-limiting examples.

Example 1

High Intensity Illumination of a Crop Field

This example describes high intensity illumination of a crop field for autonomous weed detection. An autonomous vehicle, as illustrated in FIG. 1A and FIG. 1B, equipped with a high intensity illumination system and a detection system, was positioned in a field of crops. The autonomous vehicle navigated the rows of crops, while the high intensity illumination system illuminated a region of interest of the field beneath the vehicle, and the detection system imaged the region of interest. The high intensity illumination system illuminated the region of interest with an array of light emitters, such as light emitting diodes (LEDs), arranged to provide uniform brightness across the region of interest. A voltage of 92 V was applied to each of the LEDs, such that the high intensity illumination system illuminated the region of interest with approximately 600,000 lumens per $m^2$ (lux). The applied voltage was well above the maximum voltage of 69.4 V at which the LEDs were designed to operate. To avoid overheating due to high voltage, the LEDs operated with a duty cycle of 7%. The on/off state of the LEDs was synchronized to a camera exposure of the detection system, such that the LEDs were on while the camera was exposing and off while the camera was not exposing. The camera imaged a region of the filed that was approximately 0.58 m² at a resolution of 200 pixels per inch (78.7 pixels per cm), an exposure time of 300 µs, and a depth of field of approximately 5 inches (12.7 cm). The vehicle was traveling at a speed of 0.5 mph (0.224 m/s) while imaging. As seen in the example images provided in FIG. 2, plants were clearly identifiable in the captured images, and there were no regions of oversaturation or undersaturation. Images were collected at night and during various times throughout the day without noticeable changes in illumination.

In contrast, a similar autonomous vehicle without the high intensity illumination system was used to image a region of interest of a field of crops. The autonomous vehicle without the high intensity illumination system included protective shrouds surrounding the imaging system to block stray light from the sun. Example images, collected without a high intensity illumination system while the autonomous vehicle was stationary, are shown in FIG. 3. Even with the light-blocking shroud, stray light reached the surface within the region of interest, causing uneven illumination and over-saturation of sections of the images. Oversaturated sections caused by stray light glare are denoted by arrows in FIG. 3. Glare from stray light was particularly problematic for the autonomous vehicle without the high intensity illumination system at times when the sun was at a low angle (e.g., shortly after sunrise or shortly before sunset).

Example 2

Reduction of Motion Blurring Using a High Intensity Illumination System

Figure 4A:
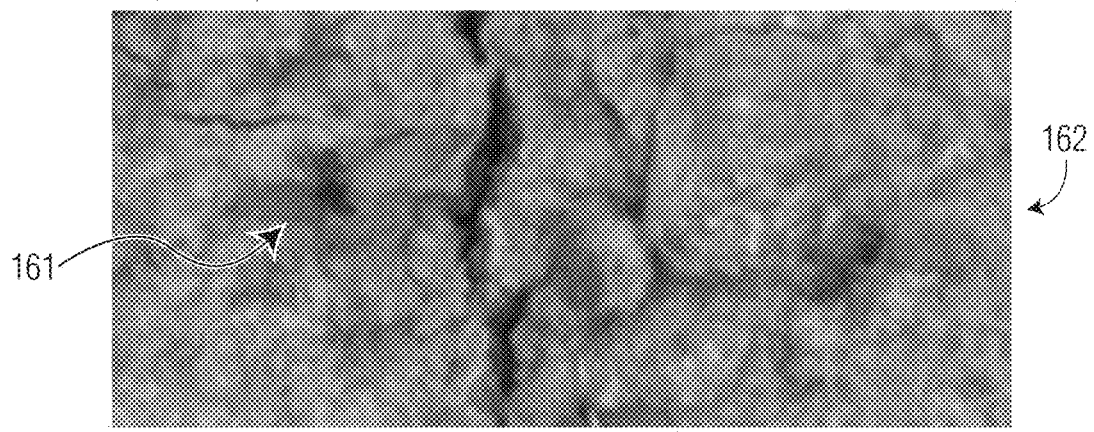
FIG. 4A shows an example image of a region of interest illuminated with 600,000 lux collected with an exposure time of 0.3 ms, while moving at a speed of 2 miles per hour, in accordance with one or more embodiments herein.
Figure 4B:
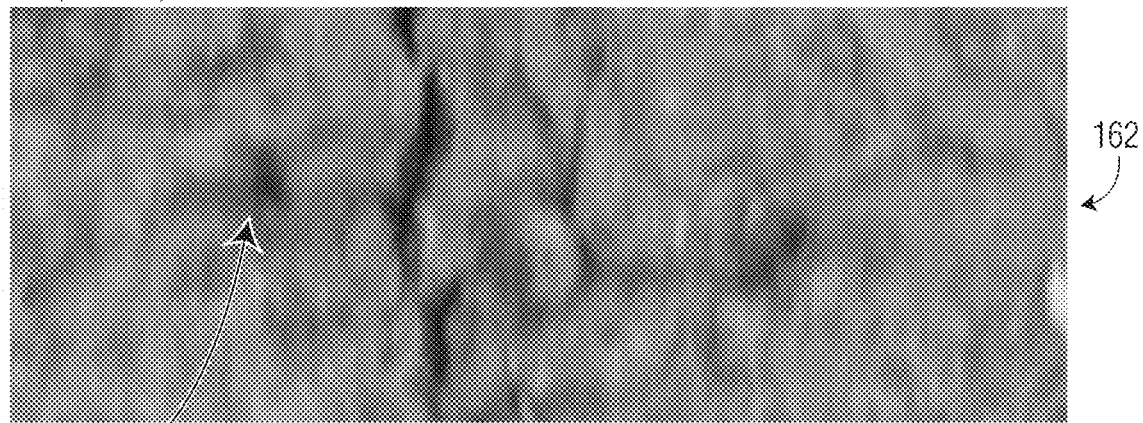
FIG. 4B illustrates simulated motion blurring when imaging a region of interest illuminated with 120,000 lux while moving at a speed of 2 miles per hour.
Figure 4C:
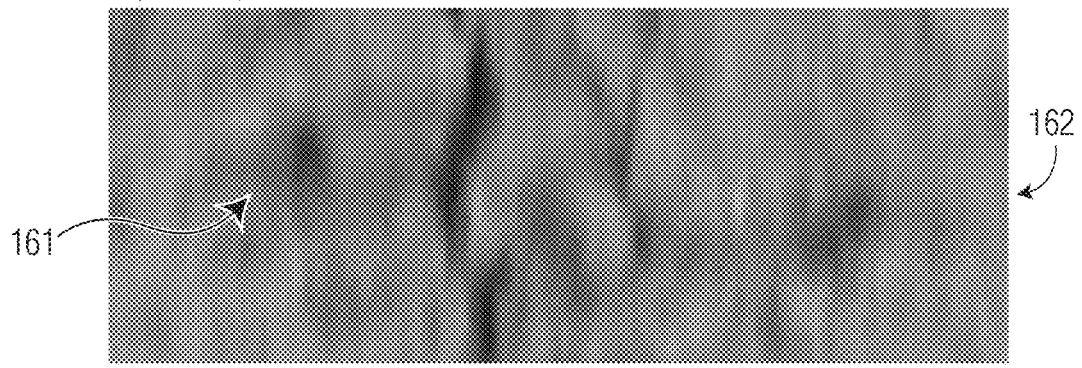
FIG. 4C illustrates simulated motion blurring when imaging a region of interest illuminated with 60,000 lux while moving at a speed of 2 miles per hour.

This example describes reduction of motion blurring using a high intensity illumination system. Illuminating a region of interest with high intensity illumination reduces motion blurring that results from movement of the camera relative to the region of interest during the frame exposure time. A camera positioned on a vehicle moving along a surface at 2 miles per hour (0.894 m/s) images regions of the surface. Under standard illumination conditions (approximately 60,000 lux), the camera exposure time is set to 3 ms to capture sufficient light for high resolution (200 pixels per inch) imaging. The resulting images contains substantial motion blurring due to the movement of the vehicle during the relatively long 3 ms exposure time. An image simulating 3 ms exposure time with 60,000 lux illumination is shown in FIG. 4C. The vehicle moves approximately 2.68 mm relative to the surface during the 3 ms exposure. As seen in FIG. 4C, the motion blurring obscures detection of objects, such as weeds, within the image.

Images are collected from a vehicle moving at 2 miles per hour equipped with an illumination system. With illumination comparable to bright daylight conditions (approximately 120,000 lux), the camera exposure time is set to 1.5 ms to capture sufficient light for high resolution (200 pixels per inch) imaging. The resulting images contain some motion blurring, but substantially less blurring than images captured under 60,000 lux with 3 ms exposure. An image simulating 1.5 ms exposure time with 120,000 lux illumination is shown in FIG. 4B. The vehicle moves approximately 1.34 mm relative to the surface during the 1.5 ms exposure. Some blurring is still visible in FIG. 4B, but objects, such as weeds, can be detected within the image.

Finally, images are collected from a vehicle moving at 2 miles per hour equipped with a high intensity illumination system. With illumination comparable to five times the brightness of the sun (approximately 600,000 lux), the camera exposure time is set to 0.3 ms (300 µs) to capture sufficient light for high resolution (200 pixels per inch) imaging. The resulting images contain almost no detectable motion blurring. An image collected at 0.3 ms exposure time with 600,000 lux illumination is shown in FIG. 4A. The vehicle moves only 0.27 mm relative to the surface during the 0.3 ms exposure. As seen in FIG. 4A, objects, such as weeds, can be detected and identified within the image.

Example 3

Light Emitting Diode Arrays

This example describes light emitting diode (LED) arrays configured to produce uniform illumination across a region of interest on a surface. The LEDs are arranged on the underside of an autonomous vehicle, as shown in FIG. 5B and FIG. 6B, and are configured to illuminate the surface beneath the vehicle as the vehicle travels over the surface and collects images of regions of interest. Examples of LED arrays configured to produce uniform illumination on a surface are shown in FIG. 5A and FIG. 6A. A vehicle may be equipped with multiple LED arrays. The LED arrangement is tailored to produce even illumination of a surface of interest, such as a field with rows of crops. The LED arrangement is determined using a computer simulation to minimize variations in the sum of the intensity from a plurality of LEDs across a region of interest of the surface. The computer simulation considers parameters including the number of LEDs, presence and type of reflectors, geometric constrains of a devise on which the lighting arrays are positioned, distance from the surface, and field of view of a camera positioned to image the region of interest. The computer simulation varies parameters including position of LEDs, number of LEDs, angle of LEDs, inclusion of reflectors, and type of reflectors.

Example 4

Electrical Configuration of a High Intensity Illumination System

This example describes an electrical configuration of a high intensity illumination system. The high intensity illumination system includes a light emitting diode (LED) array and one or more cameras. The LED array and the cameras are controlled by a strobe printed circuit board (PCB), as shown in FIG. 7, which is operated by a computer. The strobe PCB provides a strobe signal to the LED array to turn the LEDs on and off. The on/off state of the LEDs is synchronized with the camera trigger such that the LEDs are on while the camera is collecting data and/or exposing an image. The strobe PCB is designed to provide a voltage to the LEDs that is approximately double the designed operating voltage of the LEDs. The higher than recommended voltage enables the LED array to produce an illuminance of 600,000 lumens per m² (lux), approximately five times as bright at the sun during peak daylight on a sunny day. To prevent overheating as a result of the high voltage, the LEDs are operated with a duty ratio of 7%. A heat sink is added to the LEDs to further prevent overheating.

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for damaging or killing target plants, the system comprising:
a movable platform configured to move over a region of interest on a surface;
a camera carried by the movable platform;
a lighting array carried by the movable platform, wherein the lighting array is configured to illuminate the region of interest to reduce or eliminate shadows in the region of interest;
an emitter carried by the movable platform, the emitter configured to emit a beam toward a target; and
one or more processors carried by the movable platform, the one or more processors configured to perform operations comprising:
activating the lighting array to illuminate the region of interest,
obtaining an image of the region of interest from the camera while the region of interest is illuminated by the lighting array,
identifying a target plant in the image of the region of interest, wherein the identifying comprises differentiating between the target plant and a non-target plant in the image of the region of interest,
determining a target location of the target plant in the region of interest, and
causing the emitter to emit the beam toward the target location of the target plant to damage or kill the target plant.

2. The system of claim 1, wherein the illumination from the lighting array is oriented downward toward the region of interest to reduce or eliminate the shadows in the region of interest.

3. The system of claim 2, wherein the lighting array is configured to produce an illuminance within the region of interest that varies by no more than 50% across the region of interest.

4. The system of claim 3, wherein the region of interest has an area of at least 0.1 m$^2$.

5. The system of claim 1, wherein the movable platform is configured to move while the camera is obtaining the images of the region of interest, and wherein the illumination from the lighting array is configured to reduce or eliminate motion blurring in the image.

6. The system of claim 1, wherein the illumination from the lighting array is configured to reduce or eliminate variations in illuminance within the region of interest due to variable ambient light.

7. The system of claim 1, wherein the lighting array comprises a plurality of light-emitting diodes (LEDs).

8. The system of claim 1, wherein the lighting array is coupled to the movable platform such that the region of interest illuminated by the lighting array is underneath the movable platform.

9. The system of claim 1, wherein the target plant is a weed and the non-target plant is a crop.

10. The system of claim 9, wherein the differentiating is performed using a neural network that is trained on images of weeds and crops.

11. The system of claim 1, further comprising deactivating the lighting array after the image of the region of interest is obtained.

12. The system of claim 2, further comprising a reflector configured to redirect light toward the surface.

13. The system of claim 2, further comprising a heat sink configured to dissipate heat.

14. The system of claim 1, wherein the beam is a laser beam that is configured to burn the target plant.

15. A method for damaging or killing target plants, the method comprising:
moving a movable platform over a region of interest;
activating a lighting array carried by the movable platform to illuminate the region of interest to reduce or eliminate shadows in the region of interest;
obtaining an image of the region of interest using a camera carried by the movable platform while the region of interest is illuminated by the lighting array;
identifying a target plant in the image of the region of interest;
determining a target location of the target plant in the region of interest; and
activating an emitter carried by the movable platform to emit a beam toward the target location of the target plant to damage or kill the target plant.

16. The method of claim 15, wherein the illumination from the lighting array is oriented downward toward the region of interest to reduce or eliminate the shadows in the region of interest.

17. The method of claim 16, wherein the lighting array is configured to produce an illuminance within the region of interest that varies by no more than 50% across the region of interest.

18. The method of claim 17, wherein the region of interest has an area of at least 0.1 m$^2$.

19. The method of claim 15, wherein the movable platform is moving while the camera obtains the image of the region of interest, and wherein the illumination from the lighting array is configured to reduce or eliminate motion blurring in the image.

20. The method of claim 15, wherein the illumination from the lighting array is configured to reduce or eliminate variations in illuminance within the region of interest due to variable ambient light.

21. The method of claim 15, wherein the lighting array comprises a plurality of light-emitting diodes (LEDs).

22. The method of claim 15, wherein the lighting array is coupled to the movable platform such that the region of interest illuminated by the lighting array is underneath the movable platform.

23. The method of claim 15, further comprising differentiating between the target plant and a non-target plant in the image of the region of interest.

24. The method of claim 23, wherein the target plant is a weed and the non-target plant is a crop.

25. The method of claim 24, wherein the differentiating is performed using a neural network that is trained on images of weeds and crops.

26. The method of claim 15, further comprising deactivating the lighting array after the image of the region of interest is obtained.

27. The method of claim 15, further comprising redirecting light toward the surface using a reflector.

28. The method of claim 15, further comprising dissipating heat using a heat sink.

29. The method of claim 15, wherein the beam is a laser beam that is configured to burn the target plant.

30. The system of claim 1, wherein the surface is a ground surface of a field.

* * * * *

UNITED STATES PATENT AND TRADEMARK OFFICE
CERTIFICATE OF CORRECTION

PATENT NO. : 12,365,284 B2
APPLICATION NO. : 19/043183
DATED : July 22, 2025
INVENTOR(S) : Sergeev et al.

Page 1 of 1

It is certified that error appears in the above-identified patent and that said Letters Patent is hereby corrected as shown below:

In the Claims

In Column 26, Claim 12, Line 7, delete "claim 2," and insert -- claim 1, --, therefor.

In Column 26, Claim 13, Line 9, delete "claim 2," and insert -- claim 1, --, therefor.

Signed and Sealed this
Twenty-third Day of September, 2025

John A. Squires
*Director of the United States Patent and Trademark Office*